(12) United States Patent
Simmons

(10) Patent No.: US 9,395,506 B2
(45) Date of Patent: Jul. 19, 2016

(54) CELL TOWER ENCLOSURE

(71) Applicant: 3M INNOVATIVE PROPERTIES COMPANY, St. Paul, MN (US)

(72) Inventor: Richard L. Simmons, Leander, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 621 days.

(21) Appl. No.: 13/859,342

(22) Filed: Apr. 9, 2013

(65) Prior Publication Data

US 2013/0294738 A1 Nov. 7, 2013

Related U.S. Application Data

(60) Provisional application No. 61/640,765, filed on May 1, 2012.

(51) Int. Cl.
*G02B 6/38* (2006.01)
*G02B 6/44* (2006.01)
*H02G 15/115* (2006.01)
*H02G 15/117* (2006.01)
*H02G 15/013* (2006.01)

(52) U.S. Cl.
CPC ............ *G02B 6/4439* (2013.01); *G02B 6/4442* (2013.01); *H02G 15/115* (2013.01); *H02G 15/117* (2013.01); *G02B 6/3897* (2013.01); *G02B 6/4416* (2013.01); *H02G 15/013* (2013.01)

(58) Field of Classification Search
CPC ......... H05K 7/1491; G02B 6/444; H04Q 1/06
See application file for complete search history.

(56) References Cited

U.S. PATENT DOCUMENTS

| 5,323,480 A | * | 6/1994 | Mullaney | G02B 6/4442 385/134 |
| 5,556,189 A | * | 9/1996 | Wallis | B64F 1/20 362/153.1 |
| 5,647,045 A | * | 7/1997 | Robinson | G02B 6/4454 385/135 |

(Continued)

FOREIGN PATENT DOCUMENTS

| JP | 2005-157149 A | 6/2005 |
| WO | 2009/040564 | 4/2009 |

OTHER PUBLICATIONS

International Search Report for PCT/US2013/035,782, mailed Jun. 28, 2013, 3 pp.

(Continued)

*Primary Examiner* — Tina Wong
(74) *Attorney, Agent, or Firm* — Janet Kling

(57) ABSTRACT

An enclosure for protect a cabling junction or transition point on a cell tower is described. In particular, the exemplary cell tower enclosure provides an interconnection platform for both optical and electrical conductors. The cell tower enclosure includes a cover and a base configured attachable to an open first end of the cover to provide an enclosed configuration. The base has a plurality of cable ports passing through the base to allow passage cables into and out of the enclosure. The enclosure also includes a cable management device. The cable management device has two longitudinal edges disposed between two rounded bend control portions oriented at each end of the cable management device and a plurality of optical fiber connector adapters secured along at least one of the longitudinal edges, wherein the cable management device is connected to the base by a support frame.

20 Claims, 21 Drawing Sheets

(56) References Cited

U.S. PATENT DOCUMENTS

| | | | |
|---|---|---|---|
| 5,652,820 A | 7/1997 | Glaser et al. | |
| 5,963,178 A | 10/1999 | Jones | |
| 6,778,752 B2 | 8/2004 | Laporte | |
| 6,788,871 B2* | 9/2004 | Taylor | G02B 6/4454 385/135 |
| 6,999,042 B2 | 2/2006 | Dearnley | |
| 7,190,874 B1 | 3/2007 | Barth et al. | |
| 7,260,301 B2 | 8/2007 | Barth | |
| 7,391,952 B1* | 6/2008 | Ugolini | G02B 6/4453 385/134 |
| 7,457,504 B2* | 11/2008 | Smrha | G02B 6/4454 385/135 |
| 8,009,954 B2* | 8/2011 | Bran de Leon | G02B 6/4455 385/135 |
| 8,263,863 B2* | 9/2012 | Young | H02G 3/0443 174/135 |
| 8,346,043 B2* | 1/2013 | Baum | G02B 6/4454 385/134 |
| 2002/0151332 A1 | 10/2002 | Eddy | |
| 2004/0240828 A1* | 12/2004 | Daoud | G02B 6/4452 385/136 |
| 2006/0165365 A1* | 7/2006 | Feustel | G02B 6/4452 385/135 |
| 2006/0193588 A1 | 8/2006 | Mertesdorf et al. | |
| 2006/0269204 A1* | 11/2006 | Barth | G02B 6/4442 385/135 |
| 2006/0287835 A1 | 12/2006 | Sheth | |
| 2012/0092835 A1* | 4/2012 | Miller | H01R 4/5008 361/724 |
| 2012/0200978 A1 | 8/2012 | Miller | |
| 2012/0200979 A1 | 8/2012 | Miller | |
| 2012/0256526 A1 | 10/2012 | Wei | |

OTHER PUBLICATIONS

Supplementary Partial European Search Report for EP 13784457.7, mailed Dec. 3, 2015, 5 pp.

Supplementary European Search Report for EP 13784457.7, mailed May 16, 2016, 5 pp.

* cited by examiner

CELL TOWER ENCLOSURE

The present invention relates to an enclosure to protect a wiring junction or transition point on a cell tower location. In particular, the exemplary cell tower enclosure provides an interconnection platform for both optical and electrical conductors.

BACKGROUND

The continuing expansion of wireless communication and its accompanying wireless technology will require many more "cell sites" than currently deployed. This expansion has been estimated from a doubling to a ten-fold increase in the current number of cell sites, particularly in the deployment of 4G/LTE. This dramatic increase in the number of cell sites is due, in large part, to the high bandwidth demand for wireless applications and the bandwidth to the cell site must be shared to the available UE (user equipment) within range of the site.

Better wireless communication coverage is needed in order to get the bandwidth to the increasing number of customers that demand it. Thus, new deployments of traditional, large "macro" cell sites, which typically include large cell towers, are continuing. With that increased cell tower deployment, there is a need for additional accessories and components used to distribute cables and wiring on the cell towers.

SUMMARY

The present invention relates to an enclosure to protect a wiring junction or transition point on a cell tower location. In particular, the exemplary cell tower enclosure provides an interconnection platform for both optical and electrical conductors.

In one exemplary embodiment, the cell tower enclosure includes a cover longitudinally extending from an open first end to a closed second end, the cover defining an internal cavity extending in the longitudinal direction and a base configured for attachment to the open first end of the cover to provide an enclosed configuration when wherein the cover can be secured over at least a portion of the base. The base has a plurality of cable ports passing through the base to allow passage cables into and out of the enclosure. The enclosure also includes a cable management device. The cable management device has two longitudinal edges disposed between two rounded bend control portions oriented at each end of the cable management device and a plurality of optical fiber connector adapters secured along at least one of the longitudinal edges, wherein the cable management device is connected to the base by a support frame.

In an exemplary aspect, the cell tower enclosure includes a power connection portion disposed on an upper section of the support frame wherein the power connection portion can include an electrical device. In another exemplary aspect, the cell tower enclosure includes a plurality of cable management devices and a plurality of electrical devices arranged radially about the central axis of the enclosure.

In another exemplary embodiment of a cell tower enclosure, the enclosure provides a demarcation and interconnection point on the cell tower for electrical and optical fiber cables. The cell tower enclosure includes a cover longitudinally extending from an open first end to a closed second end, the cover defining an internal cavity extending in the longitudinal direction and a base configured for attachment to the open first end of the cover to provide an enclosed configuration when wherein the cover can be secured over at least a portion of the base. The base has a plurality of cable ports passing through the base to allow passage cables into and out of the enclosure. The cell tower enclosure further includes a support frame connected to the base and extending into the internal cavity of the cover when the cover is secured to the base. An electrical device as well as a cable management device having two longitudinal edges disposed between two rounded bend control portions oriented at each end of the optical fiber cable management tray can be mounted to the support frame.

In a third embodiment, present invention relates to a cable management device having a base portion defined by four edges. Two of the edges are transverse edges and include rounded bend control portions extending from the base portion of the device. The other two edges are longitudinal edges which are disposed perpendicularly to and between the transverse edges. A plurality of optical fiber connector adapters are secured along at least one of the longitudinal edges of the device.

The above summary of the present invention is not intended to describe each embodiment or every implementation of the present invention. The figures and the detailed description that follows more particularly exemplify these exemplary embodiments.

BRIEF DESCRIPTION OF THE DRAWINGS

The present invention will be further described with reference to the accompanying drawings, wherein.

Figure 1:
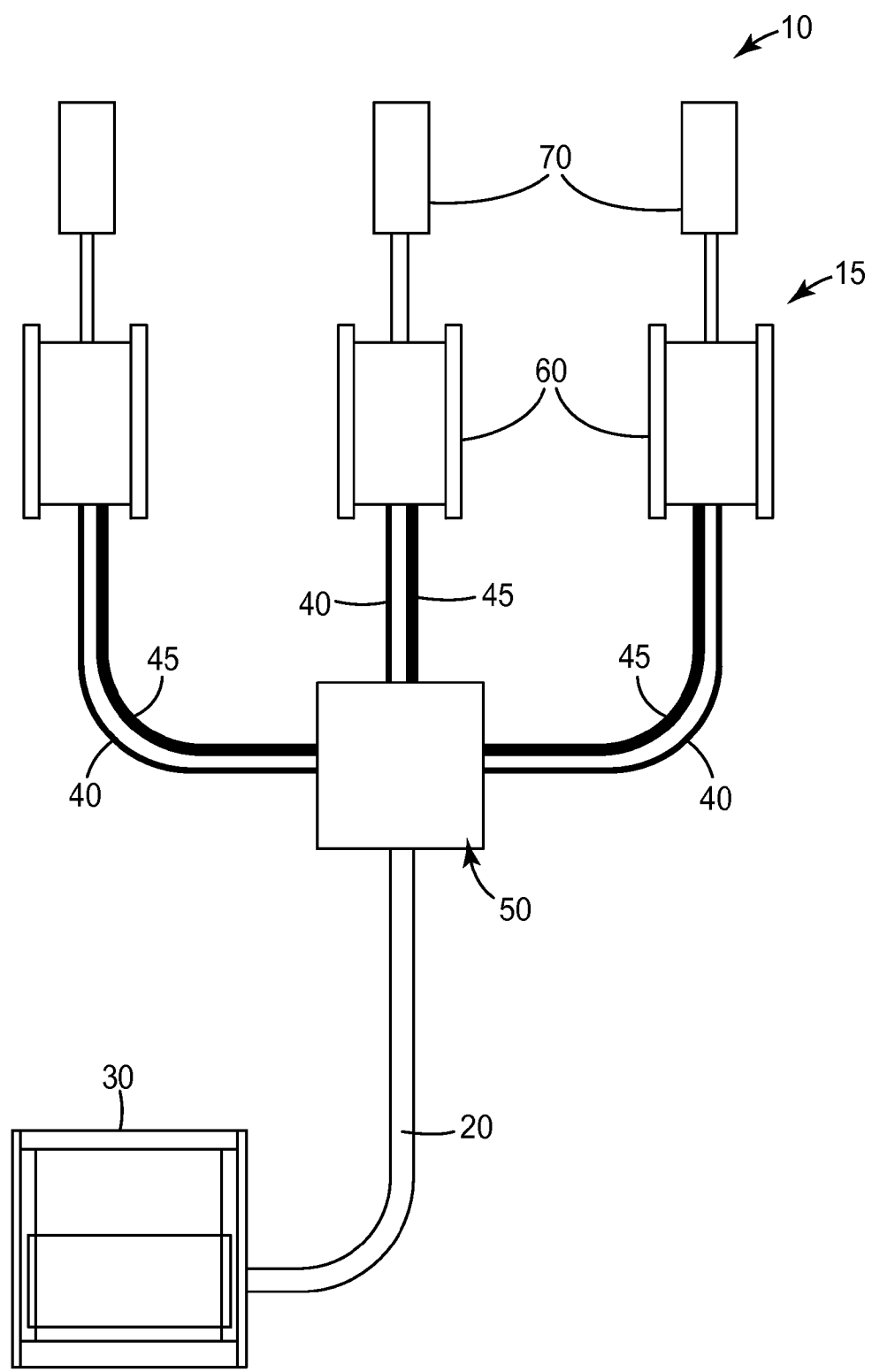
FIG. 1 is a schematic representation of cabling and components of a conventional cell tower.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Evolving requirements for increased data capability to support "smartphones" are driving the implementation of distributed radio systems with power amplifiers and radios mounted on the tower. This architecture is more power-efficient and permits more RF connections from the remote radio unit (RRU) to the antenna. This, in turn, enables advanced antennas such as Multiple In Multiple Out (MIMO) antennas to be utilized to gain the requisite signal-to-noise ratio required to support very high bandwidth LTE/4G mobile services. In most cases, the RRU is fiber-fed with digital communication protocols. In addition, placing the RRUs on the towers requires that a power (electrical) line be provided to each RRU.

In fourth generation (4G) wireless communication systems, the remote radio units are being deployed up on the tower near the antennas. Direct Current (DC) power and surge/circuit protection are required when placing the remote radio head up on the tower. In addition, 4G networks typically rely on fiber optic media to carry the high bandwidth data traffic. The interconnection points for the power cables, surge/circuit protection, and fiber optic cables need to be protected from the environment. Thus, the interconnection point is housed in a protective enclosure.

The expense of space on a cell tower to a provider is generally determined by the size and number of components they have on the cell tower. Generally in cell tower installations as shown in FIG. 1, a distribution cable 20 (e.g. a hybrid cable comprising a plurality of optical fibers and at least two electrical conductors) for carrying communication signals and power are routed from a base station, site support cabinet or cell tower terminal enclosure 30 on or near ground level up the tower to a cell tower enclosure 50 near the remote radio units 60 and corresponding antennas 70 which can be located over a hundred feet in the air. Alternatively, separate optical fiber and power distribution cables may be routed up the cell tower. Optical fiber jumper lines 40 and electrical jumper lines 45, which interconnect the cell tower enclosure 50 to the remote radio units 60, can be media specific cables as shown in FIG. 1 or can be provided in hybrid cables which contain both optical fibers and electrical power lines. In addition, alarm connection wires (not shown) can be provided in a hybrid cable or separately in a DC power cable that includes a small (AWG 22 or smaller) twisted pair in it.

Conventional cell tower enclosures are typically made of bent sheet metal. Working with traditional rectangular bent sheet metal enclosure naturally limits the designer to two dimensional (2D) or two and a half dimensional (2.5D) component layouts. Trying to utilize a rectangular box-shaped enclosure to more fully utilize a three dimensional (3D) layout of components can add detrimental complexity, size, and expense to the cost of the enclosure. Therefore, it would be advantageous to have a cell tower enclosure capable or allowing a 3D layout of the internal components in a cost effective manner.

FIG. 1 is a schematic representation of a conventional cell tower 10 having one tier 15 having three remote radio units 60 and three antennas 70. The equipment and antennas on each tier may belong to a separate telecommunication service provider. Each of the antennas in a given tier provides cell signal reception for about a 120° sector around the cell tower. Cell towers can include additional antenna tiers as well as additional antennas per tier as required for a particular network configuration. For example, each tier on a cell tower can have four antennas, each antenna providing cell signal reception for a 90° sector or six antennas, each antenna providing cell signal reception for a 60° sector. Increasing the number of antennas in a given tier can increase the signal carrying capacity of the tower.

Figure 2A:
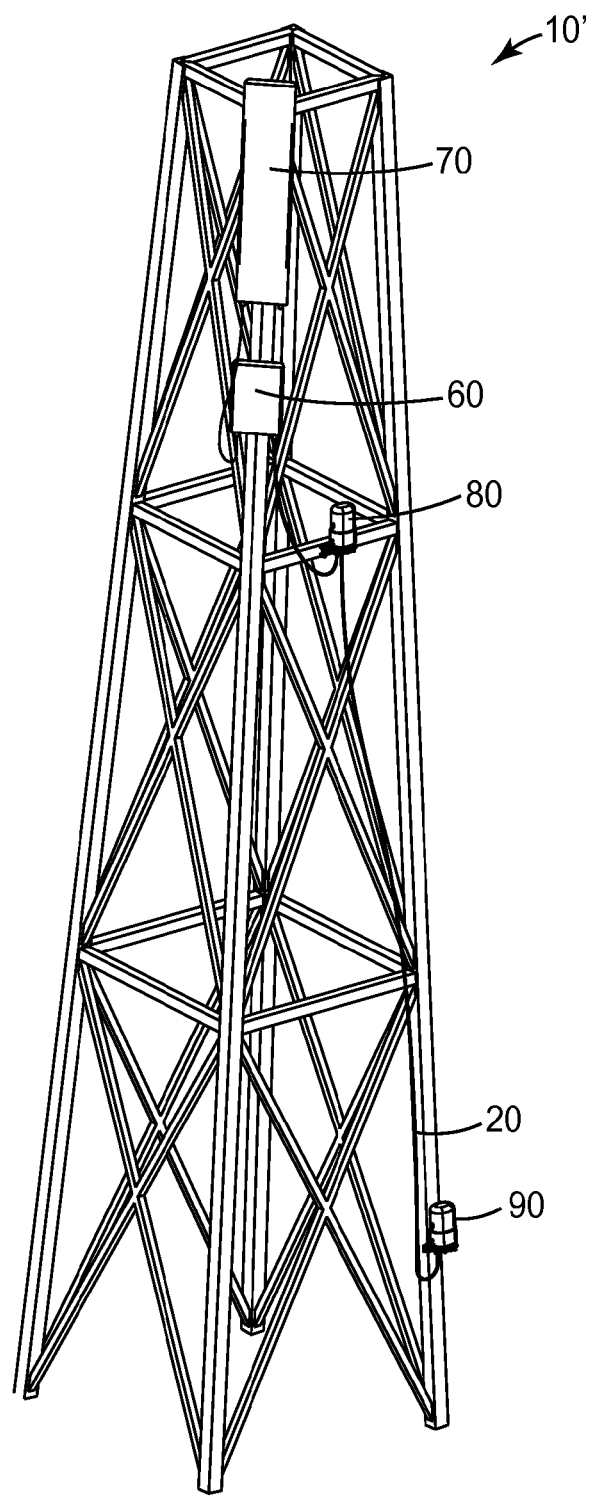
FIGS. 2A and 2B are two schematic representations an exemplary cell tower enclosure according to an aspect of the invention.
Figure 2B:
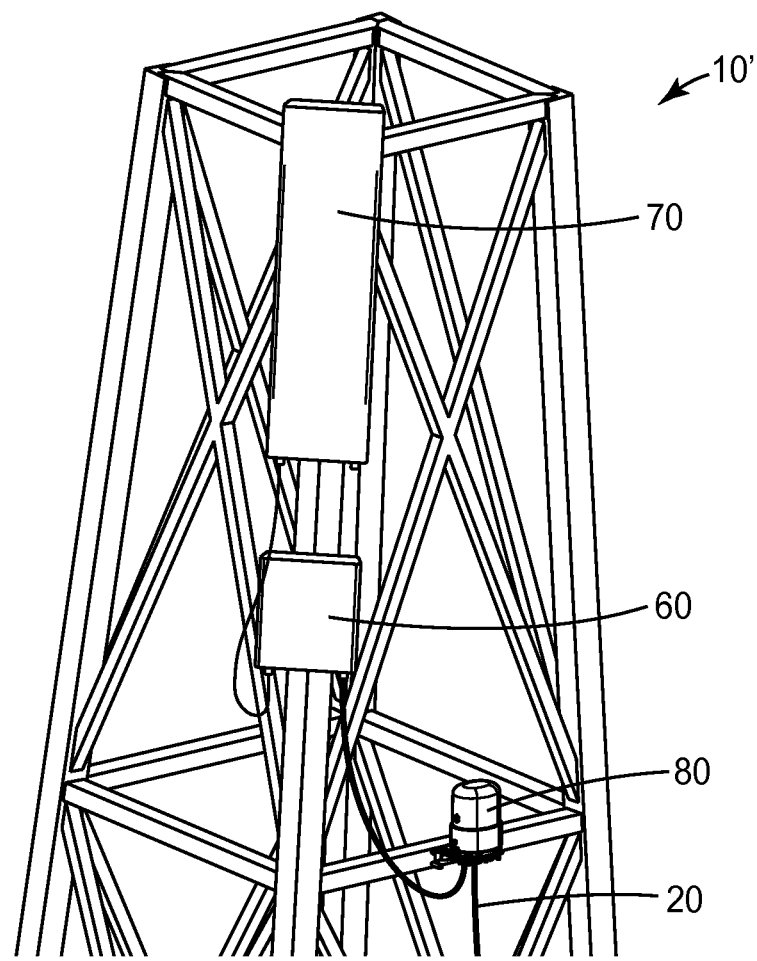

FIG. 2A shows two exemplary cell tower enclosures of the current invention (i.e. tower enclosure 80 and base terminal enclosure 90) disposed on cell tower 10'. The tower enclosures can be configured to provide an interconnection point for optical communication signals as well as DC power line connections. The cell tower enclosures 80, 90 can be configured to provide interconnections for a single remote radio unit 60 (shown in FIGS. 2A and 2B) or for a plurality of remote radio units on a single tier of the tower. In addition, cell tower enclosure 80 and base terminal enclosure 90 can be configured to house one or more electrical devices to protect sensitive electronics from effects of lightning strikes and/or power surges.

Figure 3:
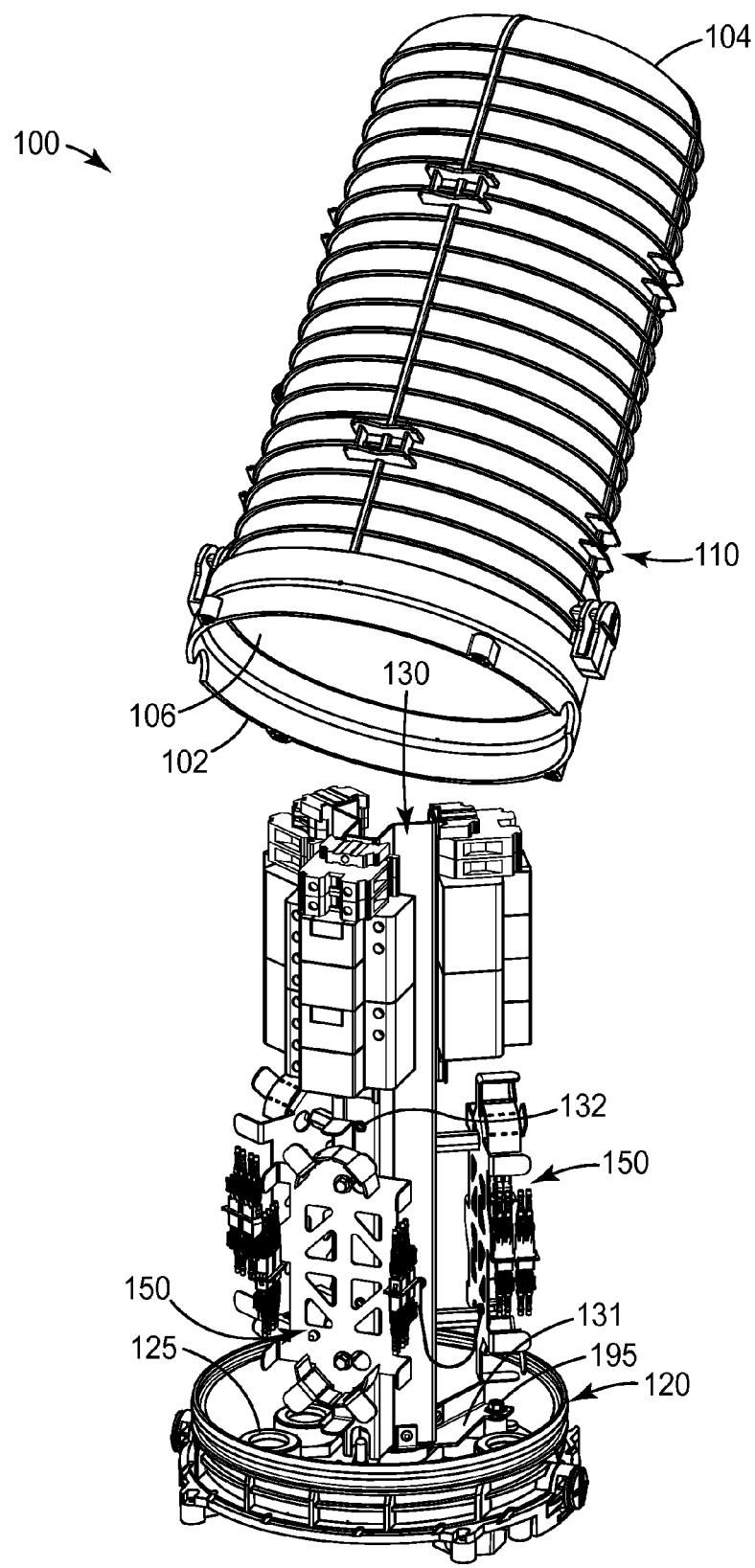
FIG. 3 is an isometric view of an exemplary enclosure according to an aspect of the invention.

FIG. 3 shows an exemplary embodiment of a cell tower enclosure 100 that is configured as an interconnection point for the optical signal and electrical power feeds for up to six remote radio units. Enclosure 100 is shown in an open state and includes a cover 110, a base 120 and a support frame 130.

The cover 110 and the base 120 of cell tower enclosure 100 are configured for engagement with each other and used, in a manner to be described below, to form a protective re-enterable enclosure. Cover 110 can have a generally domed or bell-jar shape. While enclosure 100 is shown as having a generally circular dome construction, the enclosure may assume other shapes or configurations as are required for a particular application. Similarly, the base can have a substantially oval cross-section in the transverse direction that matches the shape of the open end of the cover 110. However, shape of the transverse cross-section of the cover and base may be substantially elliptical, rectangular, square, or any other shape as is required or desired for a particular application. The closed second end 104 of the cover 110 may likewise be any suitable shape.

Cover 110 longitudinally extends from an open first end 102 to a closed second end 104. The cover defines an internal cavity 106 extending in the longitudinal direction from the first end to the second closed end of the cover. Cover 110 can be slid over at least a portion of base 120 and secured in place by a securing mechanism (not shown) such as a clamp, a bail, a swing latch, buckle latch or another conventional latching mechanism.

Referring to FIGS. 3, 4A-4C and 6A-6B, base 120 includes a plurality of ports 125 for receiving optical fiber cables, power cables and/or optical/electrical hybrid cables. The number of ports may vary depending on the specific network configuration on the tower (i.e. the number of remote radio units being served by the enclosure as well as by the type and number of cables entering and exiting the cell tower enclosure). For example, each remote radio unit can be served by two optical fibers and a pair of power conductors. Thus, the jumper lines can be individual jacketed cables each carrying a separate conductor (optical or electrical), multi-conductor cables carrying at least two optical fibers or two electrical conductors or a hybrid cable carrying at least two optical fibers and two electrical conductors. The distribution cables can be multi-fiber optical cables having at least twice as many optical fibers as the number of remote radio units served by the cell tower enclosure and an electrical cable having at least two electrical conductors having sufficient capacity to power all of the remote radio units supported by the enclosure, or the distribution cable can be a hybrid cable having a sufficient number of optical fibers and electrical conductors to serve each remote radio unit to be interconnected within the cell tower enclosure.

The cable ports 125 can be round, elliptical, hexagonal or any other polygonal shape. In the exemplary aspect shown in FIG. 6A, base 120 includes five round adapter ports 125a that have a hexagonal shroud 124 and one oval port 125b. The hexagonal shroud can provide a keying mechanism for a conventional cable sealing apparatus such as 3M™ External Cable Assembly Module Cable Entry Ports available from 3M Company (St. Paul, Minn.). The oval port can be fitted with an adapter plate 126 that is configured to have a first conventional port 126a similar to ports 125a and a second port 126b configured to accept a cable gland 128 such as a Heyco M3204 Heyco®-Tite Liquid Tight Cordgrips available from Heyco Products, Inc (Toms River, N.J.). The adapter plate can be held in place by conventional clamping hardware and mechanical fasteners.

For example a hybrid conductor distribution cable can enter cell tower 100 through cable port 126b wherein the cable gland 128 provides an environmental seal around the cable. The jumper cables (optical and electrical) from the cell tower enclosure to the remote radio units can exit the enclosure through ports 125a and 126a.

The round adapter ports 125a through the base can be configured to accept a cable sealing apparatus capable of providing an environmental seal between the cables entering the cell tower enclosure and the ports through the base of the enclosure. An exemplary cable sealing apparatus 129 (FIG. 7B) can be the 3M™ 18 MM External Cable Assembly Module Cable Entry Port, available from 3M Company (St. Paul, Minn.). The cable sealing apparatus can be configured to allow a single cable to pass through each port or to allow multiple cables to pass through a single port. Optionally a plug (not shown) may be fitted into a port of enclosure 100 to fill the ports prior to the installation of the jumper lines/cables.

Figure 4A:
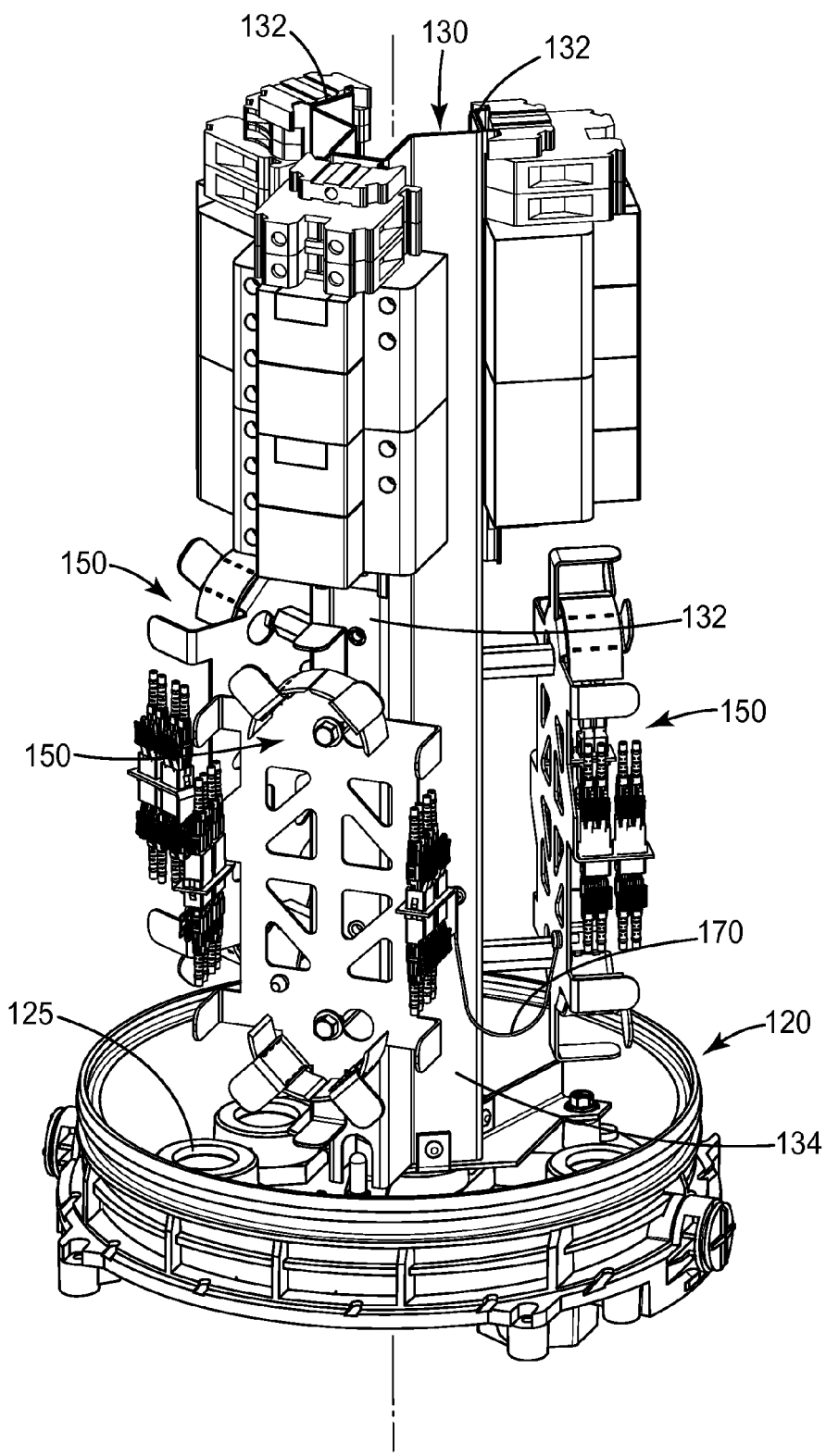
FIGS. 4A-4C are three views of a base and support frame of the enclosure of FIG. 3.
Figure 4B:
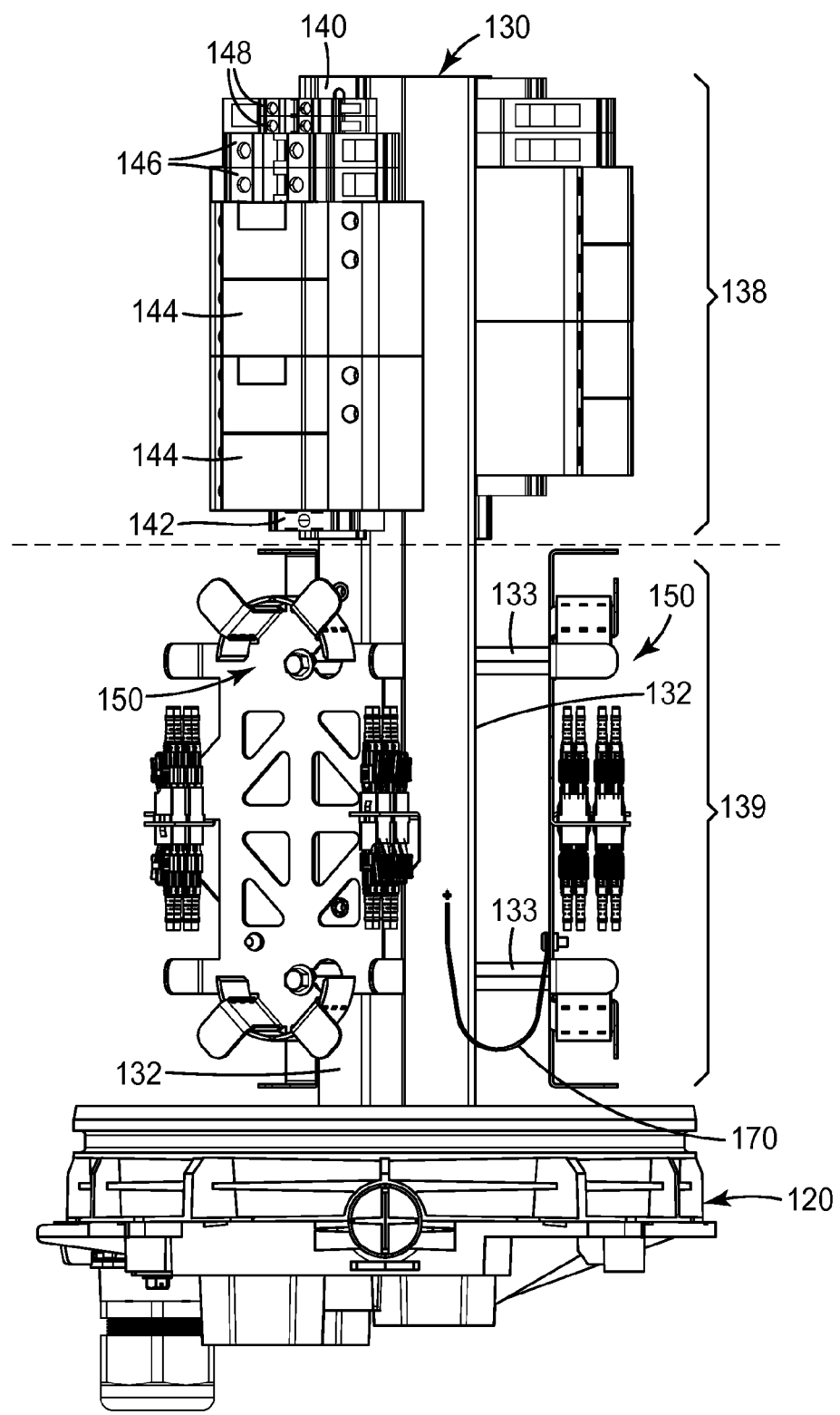
Figure 4C:
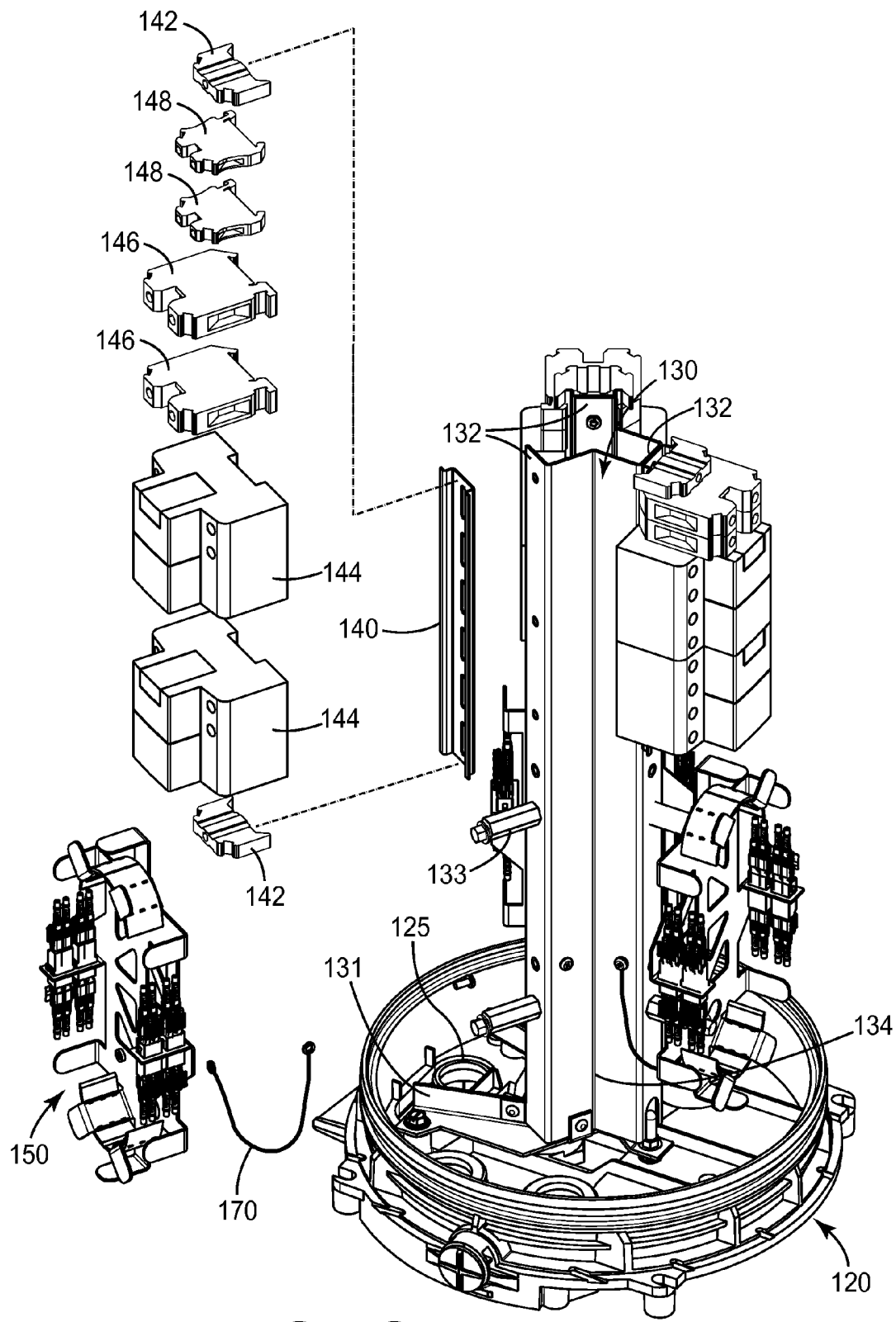

Support frame 130 can be secured to the base 120 by one or more mounting bracket portions 131 extending from the support frame as shown in FIGS. 3 and 4C. The mounting bracket portions can be configured to be secured to the base 120 by bolts, screws or other mechanical fastening mechanism known in the art.

In one exemplary aspect, mounting bracket portions 131 can be integrally formed with support frame 130, such as by stamping the support frame and mounting bracket portions from a single piece of sheet metal, molding the support frame and mounting bracket portions as a single unit, or overmolding the support frame onto mounting bracket portions. In another aspect, mounting bracket portions can be separately formed from the support frame and then secured to the support frame using any suitable conventional means, such as mechanical fasteners 195 including screws, bolts, rivets, welding, adhesive, snap-fit, mechanical interference fit, etc.

In one exemplary aspect, the support frame 130 is shaped to extend longitudinally into the internal cavity 106 of cover 110 when enclosure 100 is closed by securing the cover to the base 120. Support frame 130 in FIGS. 3 and 4A-4C is configured to support the cable management, optical and power connections and electrical devices (e.g. surge/circuit protection equipment) to support six remote radios. Specifically, the support frame has three mounting rails 132 disposed radially around the central axis of enclosure 100. Each mounting rail is configured to hold the hardware to support two remote radio units. In an exemplary aspect, the mounting rails can be spaced at about 120° intervals around the central axis. If the support frame has four mounting rails they can be spaced at about 90° intervals around the central axis.

In an exemplary embodiment, support frame 130 can be configured into two major sections, a power connection portion 138 and a fiber optic connection portion 139. In the exemplary aspect shown in FIG. 4B, the fiber optic connection portion 139 is disposed on the lower section of the support frame near base 120 and the power connection portion 138 is disposed on an upper portion of the support frame such that it will be near to the closed end of the cover when the cover is secured to the base. Alternatively, the power connection portion can be disposed on the lower section of the support frame and the fiber optic connection portion disposed on an upper portion of the support frame.

Support frame 130 is configured to have a valley 134 between adjacent mounting rails 132 to provide a pathway for routing electrical cables/conductors entering the cell tower enclosure through the ports in the base to be efficiently routed to the electrical connection portion in the upper section of the enclosure. Routing the electrical cables/conductors in the valleys between the mounting rails advantageously prevents the crossing and interference with the routing of the optical fiber cables in the lower section of the enclosure.

Power connection portion 138 can include at least one of an alarm connection strip 148, an electrical device 144, and a power connection strip 146 to connect the power conductors from the incoming distribution cable to the electrical device and from the electrical device to the conductors in the outgoing jumper lines. An exemplary wiring schematic will be described below with reference to FIG. 7A. The alarm connection strip, electrical device, and/or a power connection strip can be connected to mounting rail 132 by a Din rail 140. The DIN rail can be secured to the mounting rail, by a screw, bolt or other mechanical fastener. Additionally, DIN stops 142 can be disposed at the top and bottom of the DIN rail to retain the connection strips and/or electrical devices on the DIN Rail.

In an exemplary aspect, the alarm connection strip can be a UT6 feed-through modular terminal block available from Phoenix Contact (Middletown, Pa.).

In another exemplary aspect, the power connection strip can be a UT 35 feed-through modular terminal block available from Phoenix Contact (Middletown, Pa.) or a product from the SRK Conta Clip® product line available from Bisco Industries (Anaheim Calif.).

The electrical device can be one of a surge protector or a circuit breaker. In an exemplary aspect, the electrical device can be a surge protector such as a FLT-CP-1S-350 or a VAL-MS-T1/T2 series surge protector available from Phoenix Contact (Middletown, Pa.) or a DSE M 1 60 FM or a DSE M 2P 60 FM surge protector available from Dehn+Söhne (Neumarkt, Germany).

An exemplary DIN Stop is an E/NS 35 N end clamp available from Phoenix Contact (Middletown, Pa.).

Figure 7A:
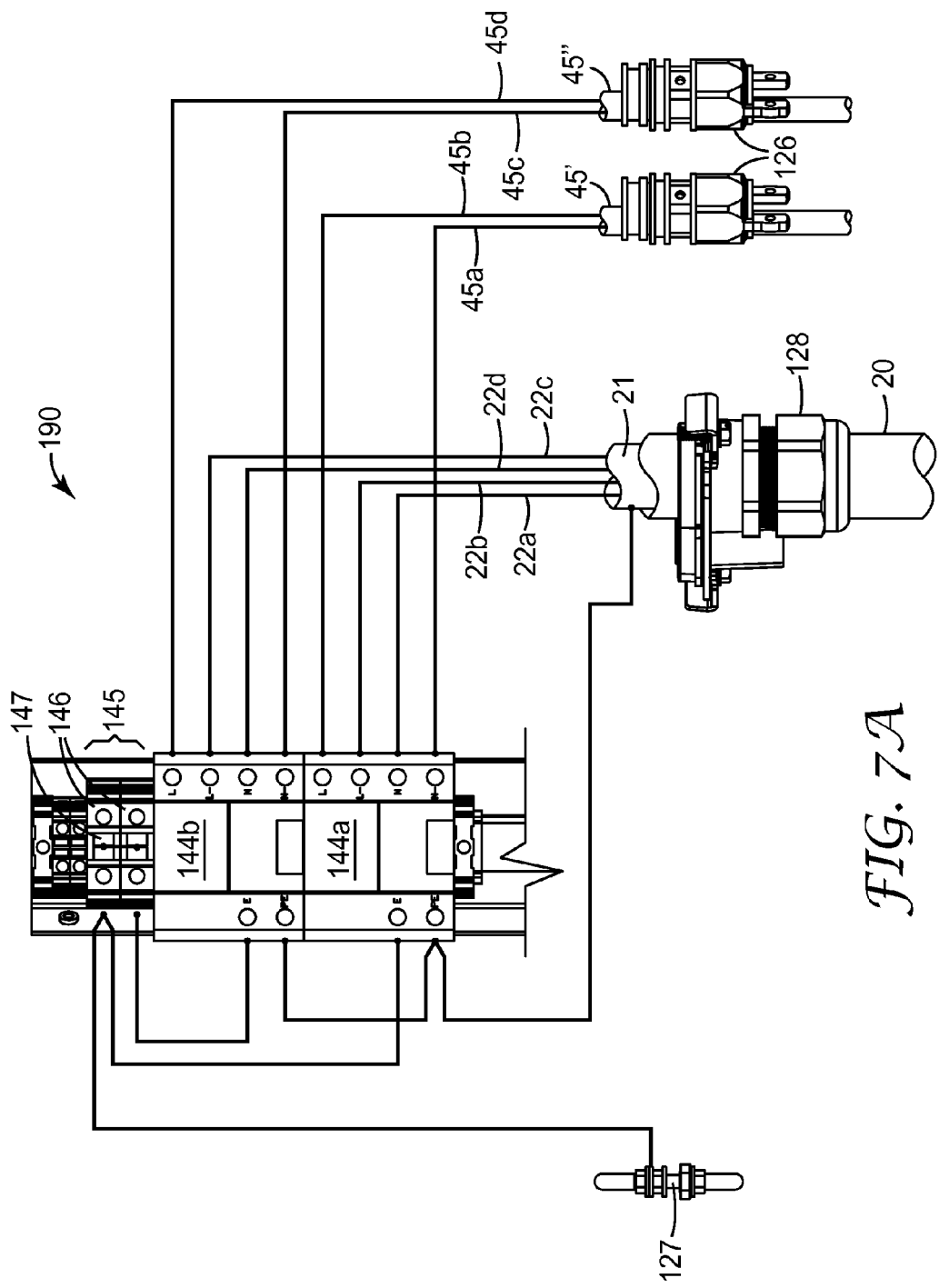
FIG. 7A shows an electrical wiring schematic diagram for a cell tower enclosure that is located up on the tower near the remote radio units according to an aspect of the invention.

FIG. 7a shows an exemplary electrical wiring scheme 190 for two of the six remote radio units served by the exemplary cell tower enclosure 100 shown in FIG. 3. First and second electrical jumper lines 45', 45", each having two electrical conductors 45a-d, enter the cell tower enclosure through a sealing apparatus 126 disposed in a port in the base of the enclosure. Conductors 45a-b are disposed in the first electrical jumper line 45' and conductors 45c-d are disposed in the second electrical jumper line 45". The conductors from the first electrical jumper line are connected to a first electrical device, such as surge protector 144a. Similarly, conductors from the second electrical jumper line are connected to a second electrical device, such as surge protector 144b.

In addition, each surge protector is connected to paired conductors 22a-b, 22c-d from the electrical distribution cable 20 that comes up the tower, as well as to a grounding bus 145 that is formed by two electrical connection strips 146 which have been jumpered together such as by bridging element 147. The grounding bus is connected to at least one of a grounding stud 127 disposed through the base of the enclosure which is connected to the infrastructure of the cell tower and/or a shield layer 21 disposed around the electrical conductors 22a-d in the electrical distribution cable 20.

The electrical distribution cable 20 can exit the cell tower enclosure through cable gland 128 disposed in a port through the base of the enclosure.

Figure 7B:
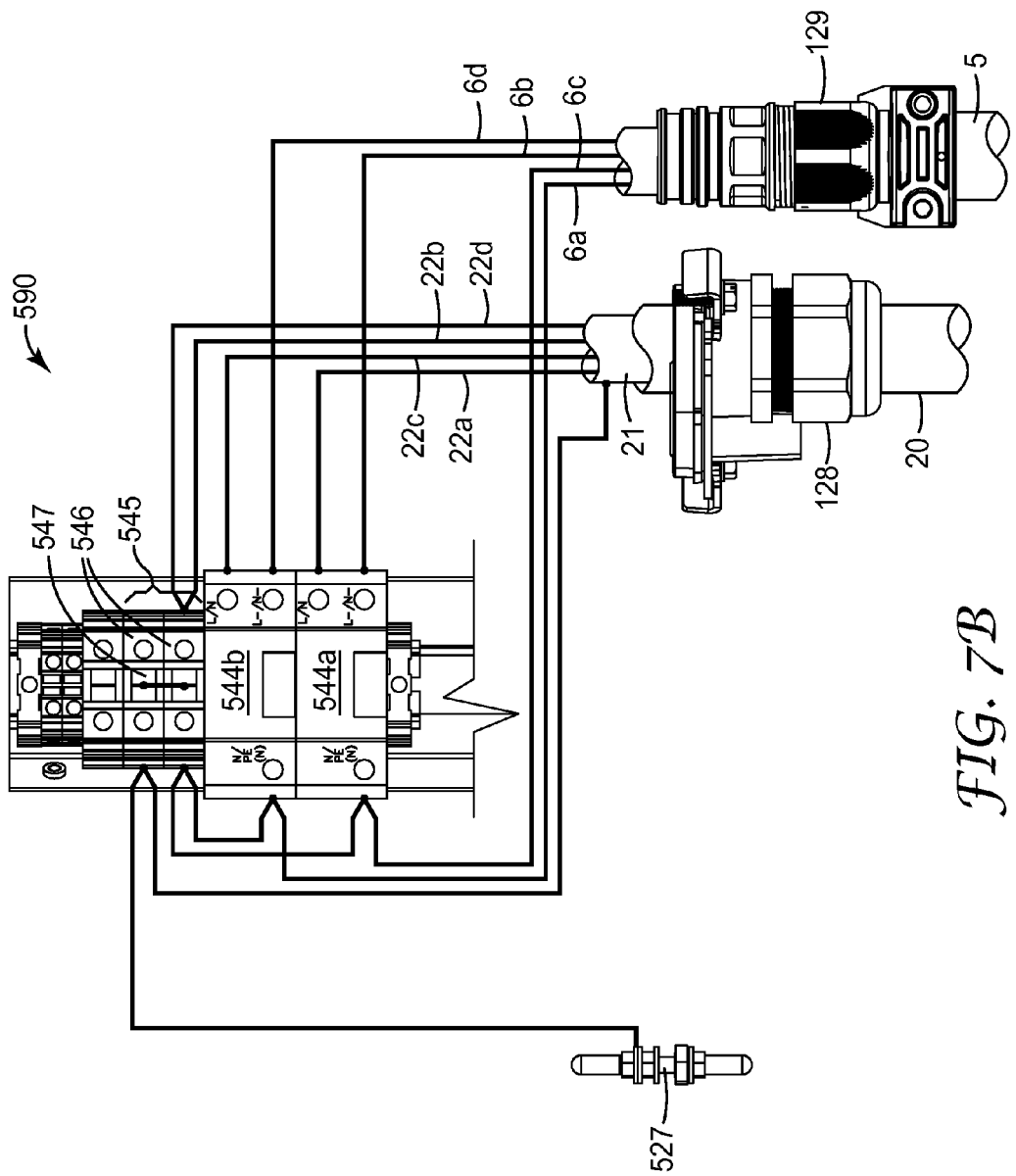
FIG. 7B shows an electrical wiring schematic diagram for a cell tower terminal enclosure that is located at the base of the cell tower according to an aspect of the invention.

Surge protection for the remote radio units can be provided at the top of the tower as described with respect to FIG. 7A, at a cell tower terminal enclosure at the bottom of the tower as shown in FIG. 7B or both. An exemplary electrical wiring scheme 590 for a terminal enclosure at the bottom of the tower that provides surge protection to two remote radio units is shown in FIG. 7B. Electrical distribution cable 20 enters the cell tower terminal enclosure through cable gland 128 disposed in a port through the base of the enclosure. Conductors 22a, 22c from the electrical distribution cable are connected to first and second electrical devices, such as surge protectors 544a, 544b while conductors 22b, 22d from the electrical distribution cable are connected to grounding bus 545.

In addition, each surge protector 544a, 544b can be connected to a pair of electrical conductors 6a-b, 6c-d, respectively, from the electrical trunk cable 5 that is connected to the land-based power grid, as well as to grounding bus 545 that is formed by two electrical connection strips 546 which have been jumpered together such as by bridging element 547. The grounding bus is connected to at least one of a grounding stud 527 disposed through the base of the enclosure which is connected to a ground spike (not shown) at the base of the cell tower and/or a shield layer 21 disposed around the electrical conductors 22a-d in the electrical distribution cable 20.

The electrical trunk cable 5 can exit the cell tower terminal enclosure through cable sealing device 129 disposed in a port through the base of the enclosure.

The wiring schematics shown in FIGS. 7A and 7B are just exemplary wiring layouts and should not be regarded as limiting. The wiring layout may vary depending on the number of remote radio units served by a given enclosure, the type and number of electrical devices in the enclosure as well as other design and layout variations.

Fiber optic connection portion 139 can include a cable management device 150 and one or more optional mounting spacers 133 to secure the cable management device to the mounting rail. For example, the spacers can engage with a keyhole shaped opening 157 disposed in a base portion 151 of the cable management device 150. This configuration allows the cable management device to be removed from the support frame during installation of maintenance of the lines and components housed in the exemplary cell tower enclosure. A lanyard 170 can be provided to connect the cable management device 150 to the support frame 130 so that the cable management device cannot be dropped when it is removed from the support frame.

Figure 5A:
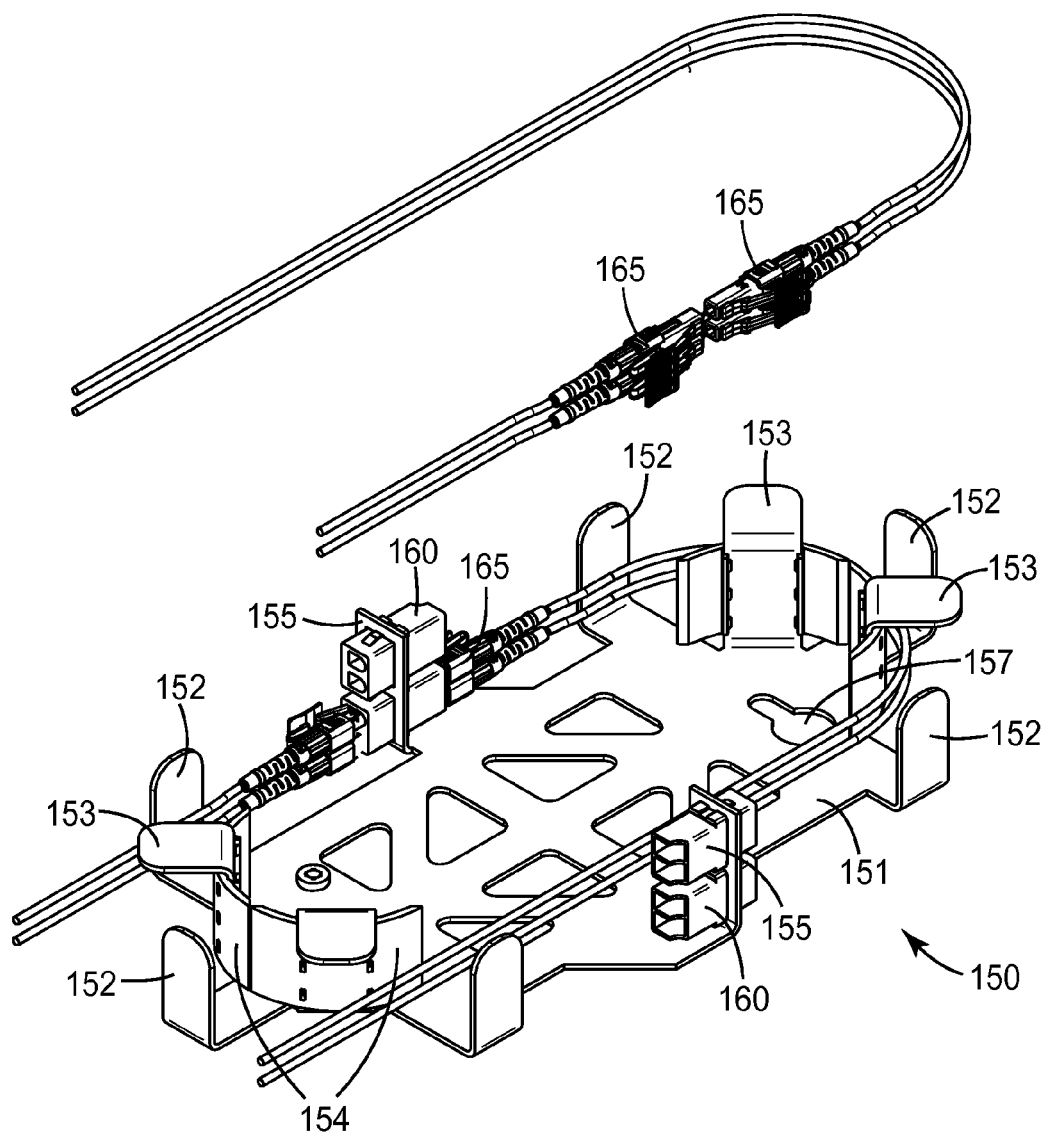
FIGS. 5A and 5B are two views of an exemplary cable management unit according to an aspect of the invention.
Figure 5B:
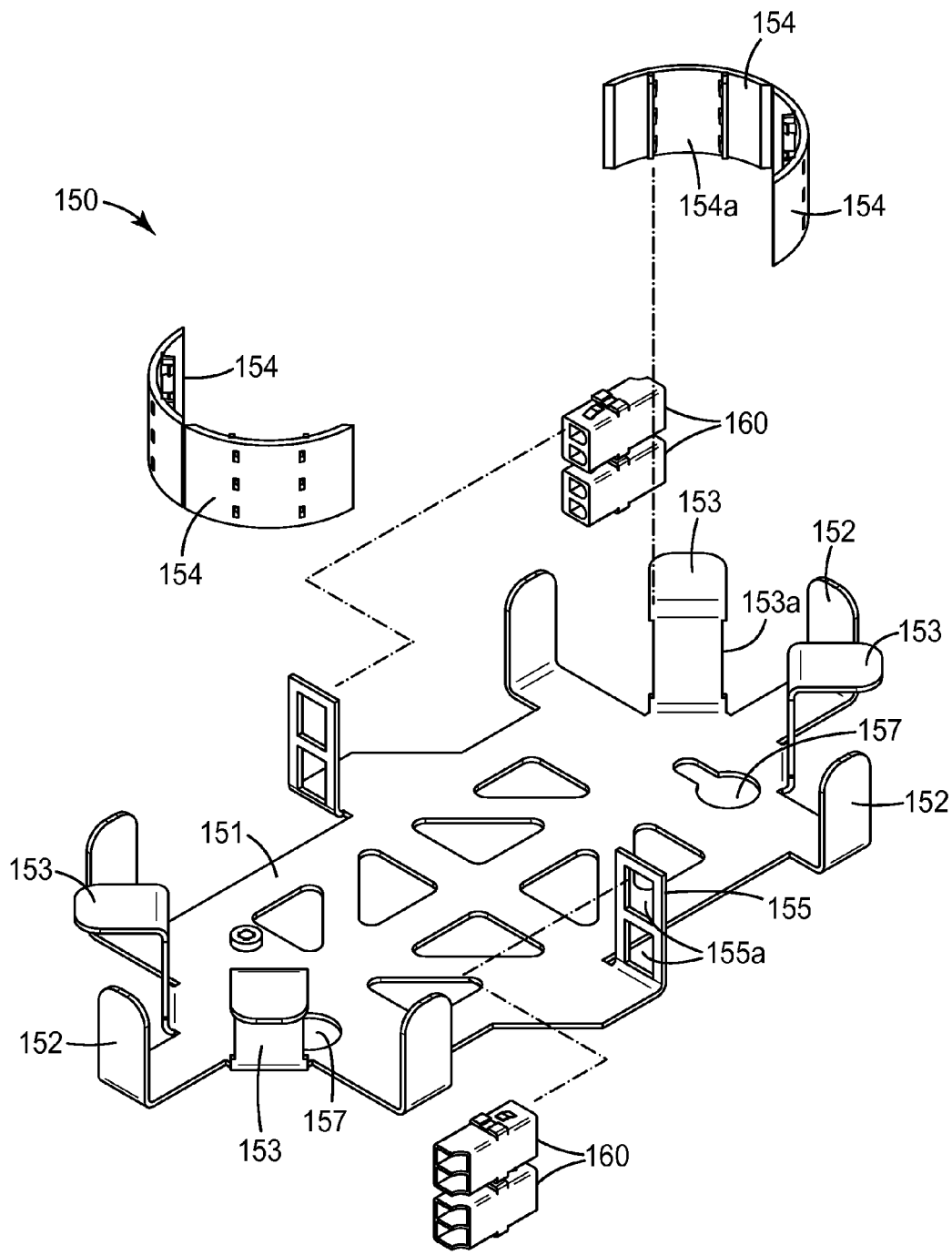
Figure 6A:
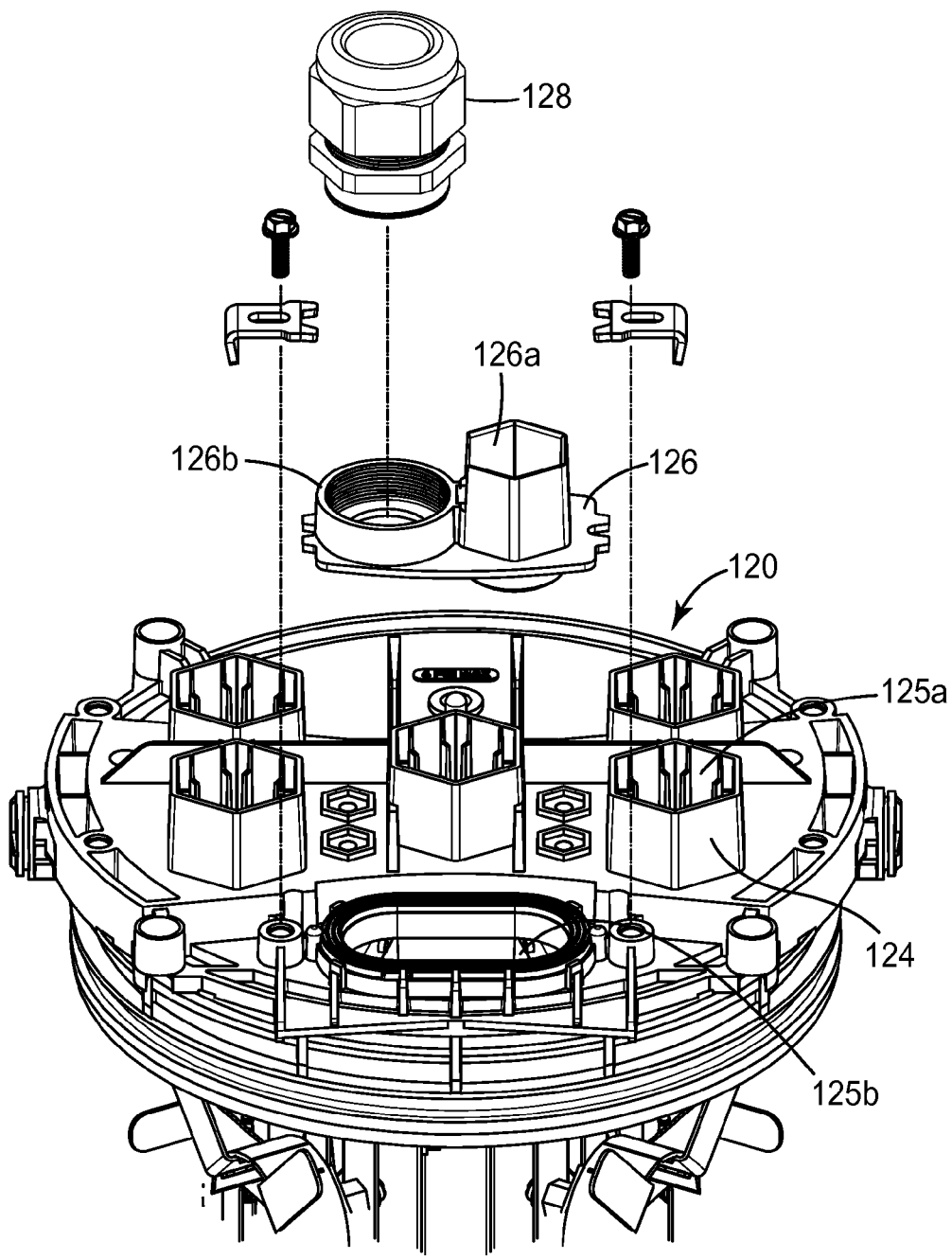
FIGS. 6A and 6B are two views of an exemplary base for a cell tower enclosure according to an aspect of the invention.
Figure 6B:
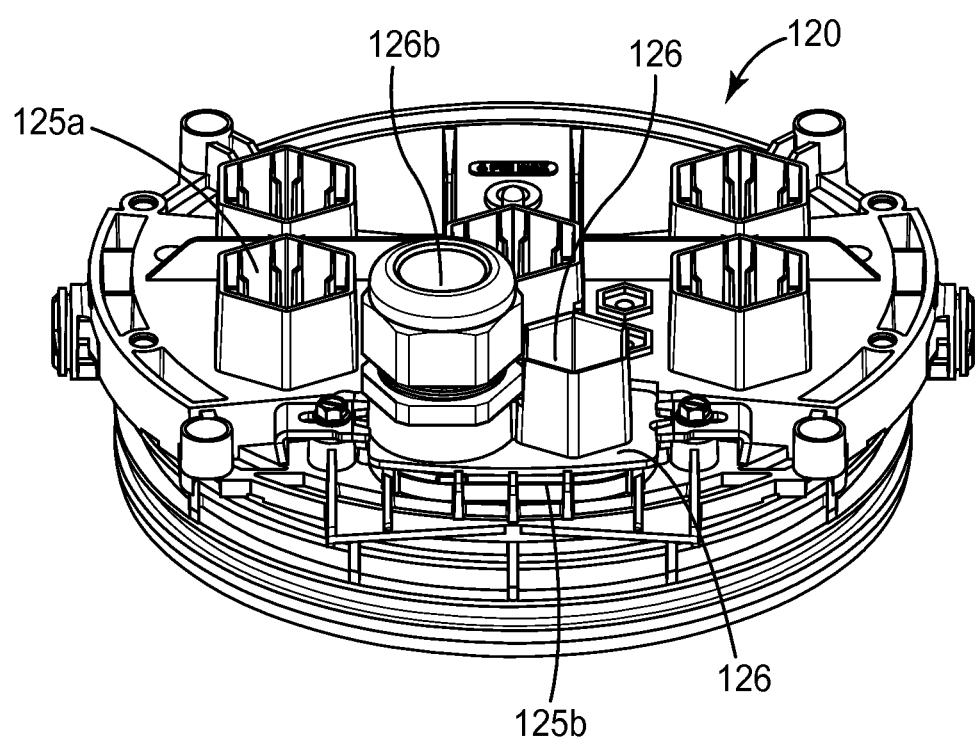

FIGS. 5A and 5B show two detail views of an exemplary cable management device 150. The cable management device can have a bottom portion 151 having four edges defined by a plurality of vertical tabs 152 extending from the bottom portion. In the embodiment shown in FIGS. 5A and 5B, the longitudinal edges of the cable management device are defined by two vertical tabs while the transverse edges are define by one centrally disposed vertical tab. The number of tabs present in cable management device 150 is a matter of design choice and should not be deemed as limiting.

The base portion 151 may be solid or have a webbed structure as shown in FIGS. 5A and 5B. The webbed structure offers the advantage of reducing the weight of cable management device 150 while maintain its structural integrity.

Cable management device 150 additionally includes a pair of outward facing L-shape tabs 153 near each transverse edge. One L-shape tab can be positioned on either side of the vertical tab 152 extending from the transverse edge of base portion 151. A rounded bend control portion 154 can be attached to each L-shaped tab to guide and control the storage and routing of optical fiber cables in the enclosure. In an exemplary aspect shown in FIG. 5B, each L-shaped tab can have a narrow or waisted portion 153a that can be engaged by a clip portion 154a on the inside radial surface of rounded portions 154. The combination of the two bend control portions at each transverse edge help support the optical cables over an approximate 180° arc to prevent violating the minimum bend radius of the optical fiber. An exemplary 40 mm radius rounded portion is the OFCG-16 Fiber Coiling Clip available from Richco, Inc. (Morton Grove, Ill.). The rounded portions can be made by an extrusion process with a thermo plastic Nylon 6/6 resin or can be injection molded using an Acrylonitrile Butadiene Styrene/Polycarbonate (ABS/PC) such as Bayblend® FR 110 available from Bayer Polymers Division (Hebron, Ohio). In another exemplary aspect, the rounded portions 154 can have a different radius. For example, the rounded portions can have a radius of 30 mm. The radius is determined in part by the design of the cable management device and by the minimum bend radius of the optical fiber to be held by the cable management device.

In other words, cable management device 150 includes a base portion 151 defining four edges wherein two of the edges are transverse edges. Each of the transverse edges includes rounded bend control portions 154. The other two edges are longitudinal edges which are disposed perpendicularly to and between the transverse edges.

A mounting bracket 155 for holding a plurality of fiber optic connector adapters 160 can be disposed along at least one longitudinal edge of cable management device. The exemplary cable management device 150 shown in FIGS. 5A and 5B includes two mounting brackets 155 extending perpendicularly from the base portion 151 of the device where in each of the mounting brackets is designed to hold two fiber optic connector adapters. Fiber optic connector adapters 160 can be any conventional fiber optic connector adapter, such as an SC format connector adapter, an LC format connector adapter, an ST format connector adapter, an FC format connector adapter, an MPO format connector adapter, etc. For increased density, LC format connector adapters can be used as shown in FIGS. 5A and 5B. Specifically, mounting bracket 155 has one or more openings 155a sized to accept fiber optic connector adapter 160 of the desired format. The fiber optic connector adapters 160 are configured to optically connect at two compatible format optical fiber connectors, or in the case of an LC format connector adapter, two sets of two LC Format optical connectors 155 may be optically connected.

In an alternative aspect each mounting bracket can be configured to hold more than two optical fiber connector adapters. The number of optical fiber connector pairs that needs to be interconnected can be two times the number of remote radio units served by the cell tower enclosure assuming that two optical fibers are required for each remote radio head. So if six remote radio heads are to be served by one cell tower enclosure, facilities for interconnecting at least twelve pairs of optical fiber connectors must provided for. This is equivalent to six LC format connector adapters or twelve SC, FC or ST format connector adapters. Additional connector adapters may be included as required by the network design.

In the embodiments and implementations described herein, the various components of the cell tower enclosure 100, support frame 130, cable management unit and elements thereof are formed of any suitable material. The materials are selected depending upon the intended application and may include both polymers and metals. In one embodiment, the base 120 and cover 110 are formed of polymeric materials by methods such as injection molding, extrusion, casting, machining, and the like, while the support frame 130 and components thereof are formed of metal by methods such as molding, casting, stamping, machining, and the like. Material selection will depend upon factors including, but not limited to, chemical exposure conditions, environmental exposure conditions including temperature and humidity conditions, flame-retardancy requirements, material strength, and rigidity, to name a few.

Figure 8:
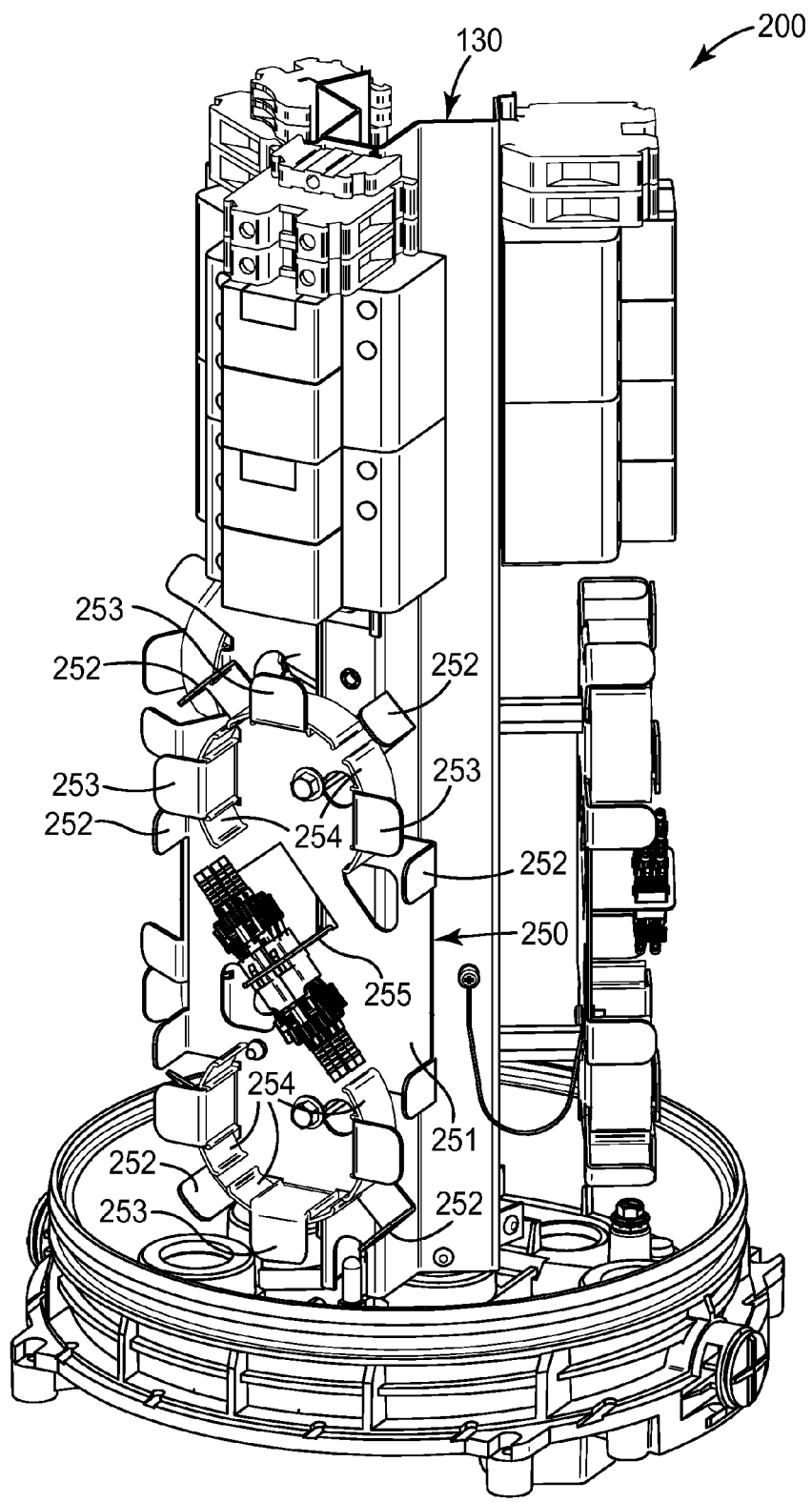
FIG. 8 is an isometric view of base and support frame having an alternative cable management unit according to an aspect of the invention.

FIG. 8 shows an alternative cable management device 250 attached to support frame 130 in exemplary cell tower enclosure 200 (shown without its cover). Mounting bracket 255 for holding a plurality of fiber optic connector adapters 160 is disposed in the middle of base portion 251 rather than along the longitudinal edges of the cable management device as described previously. The transverse edges are define by two vertical tabs 252 and three outward facing L-shape tabs 253 near each transverse edge wherein each L-shaped tab holds a rounded bend control portion 254. The combination of the three bend control portions at each transverse edge help support the optical cables over an approximate 270° arc to prevent violating the minimum bend radius of the optical fiber.

Figure 9:
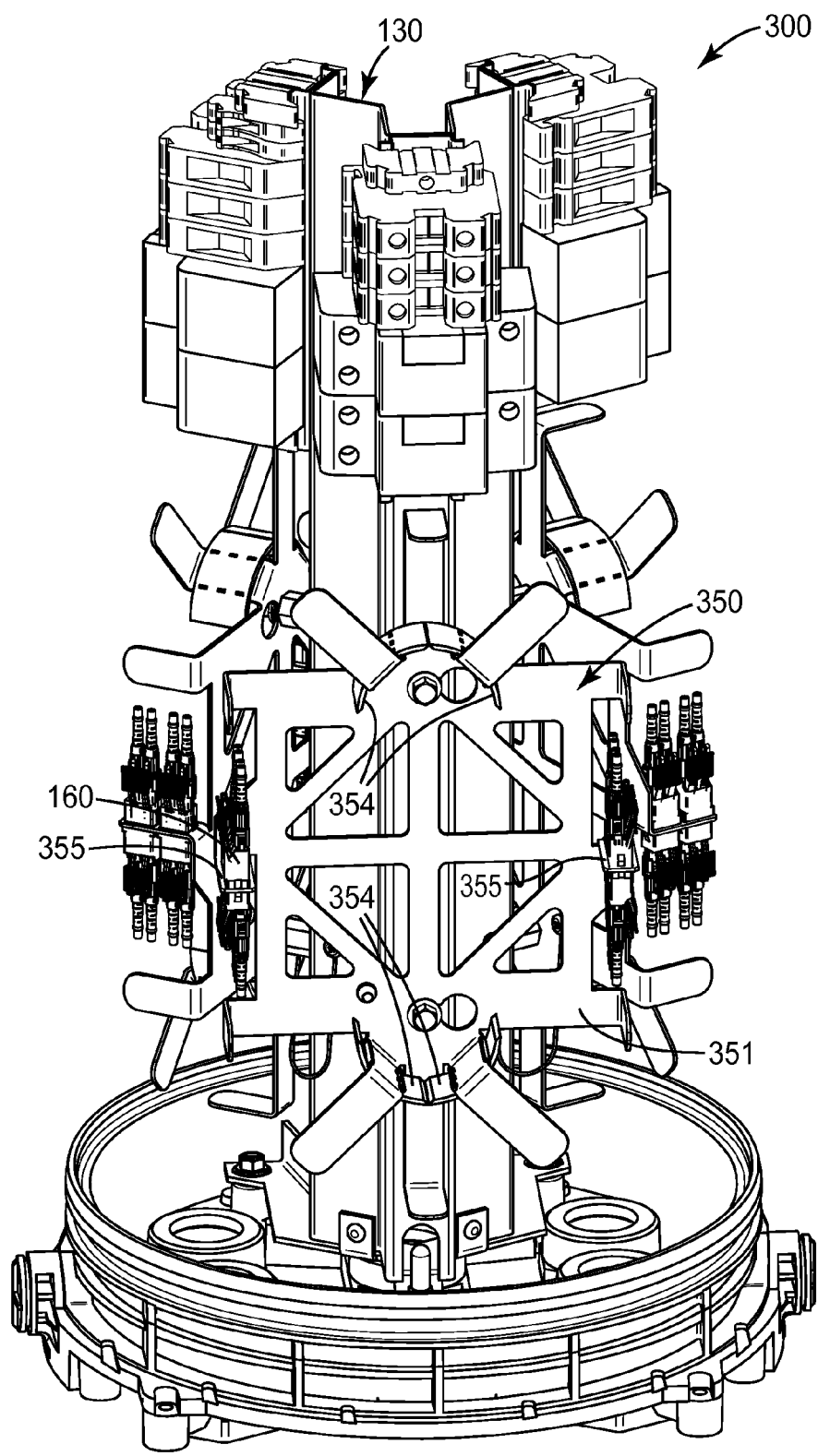
FIG. 9 is an isometric view of an alternative embodiment of base portion and support frame according to an aspect of the invention.

Depending on the location of the cell tower enclosure and architecture of the fiber to the antenna network, it may be necessary to provide additional slack storage capacity within the cable management device. FIG. 9 shows an exemplary cell tower enclosure 300 without its cover that includes an alternative cable management device 350 attached to support frame 130 that has increase storage capacity for slack fiber. Cable management 350 is wider than the previously described cable management trays. Slack cable can be wound between and around the bend control portions 354 at each transverse edge of cable management device and between mounting brackets 355 disposed along the longitudinal edges of base portion 351 and that hold the fiber optic connector adapters 160.

Figure 10A:
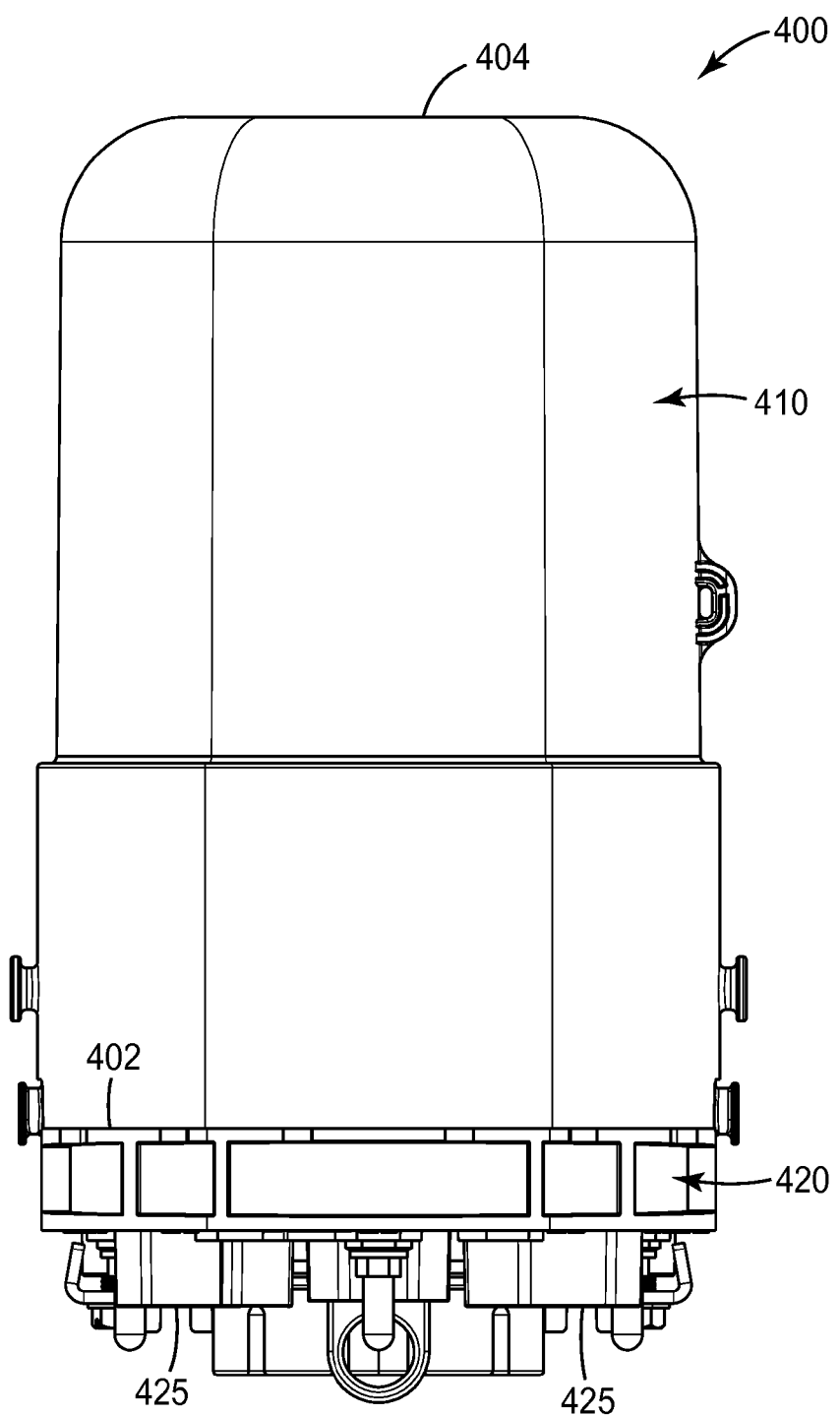
FIGS. 10A-10C are three views of an alternative exemplary enclosure according to an aspect of the invention.
Figure 10B:
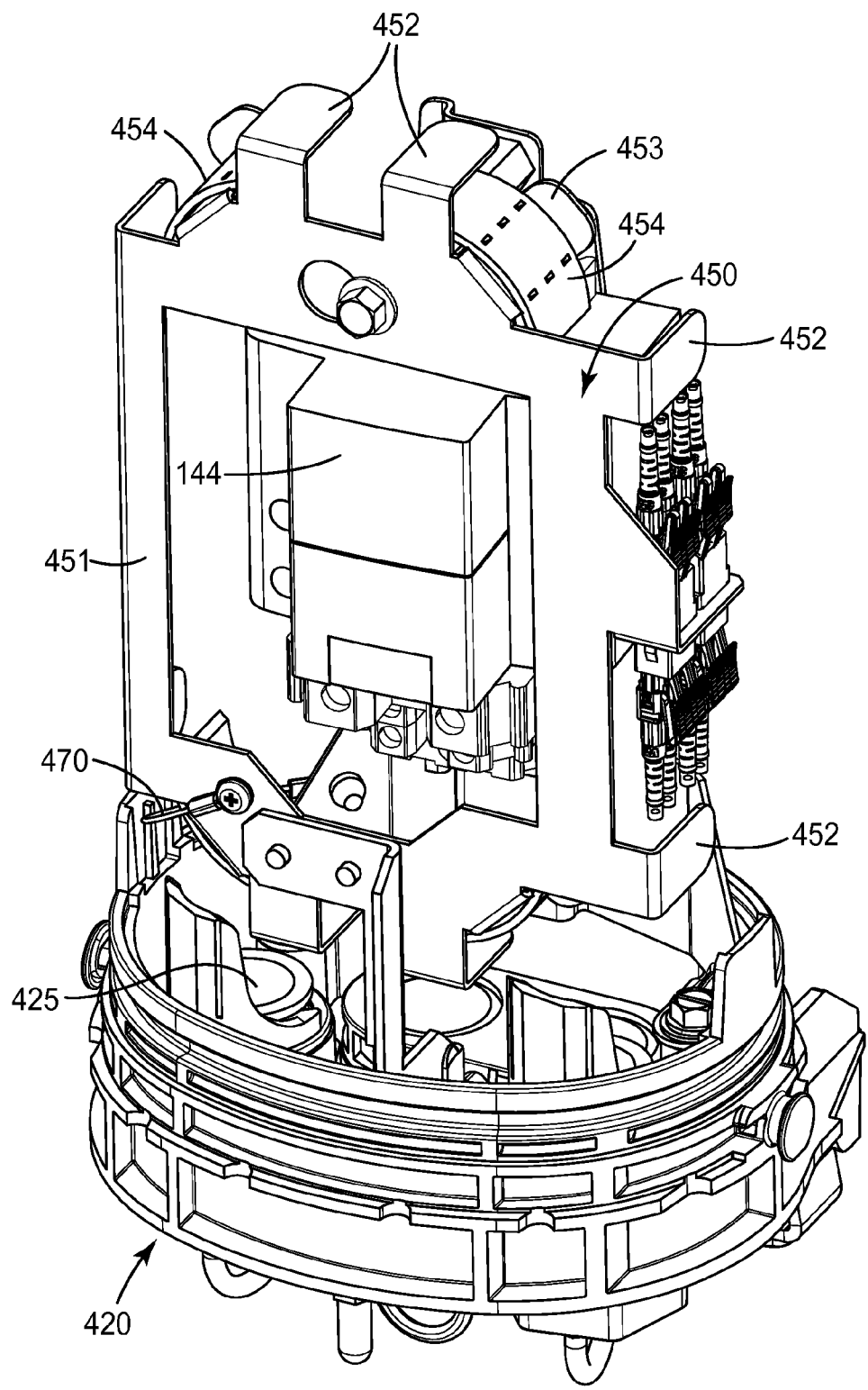
Figure 10C:
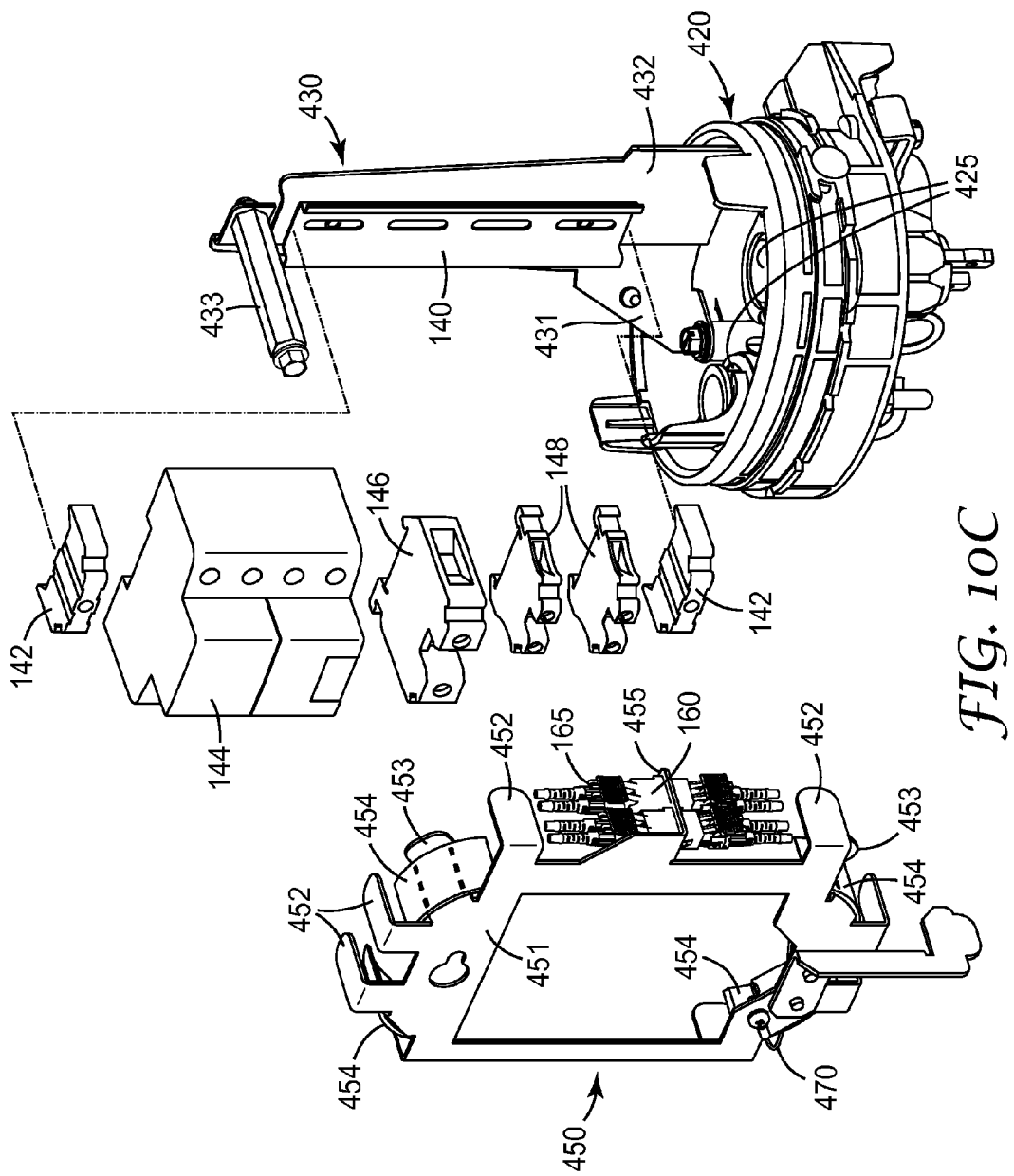

FIG. 10A shows another exemplary embodiment of a cell tower enclosure 400 that is configured as an interconnection point for the optical signal and electrical power feeds for one remote radio unit. Enclosure 400 is shown in a closed state. Referring now to FIGS. 10A-10C and cell tower enclosure 400 includes a cover 410, a base 420 and a support frame 430.

The cover 410 and the base 420 of cell tower enclosure 400 are configured for engagement with each other and used, in a manner to be described below, to form a protective re-enterable enclosure. Cover 410 can have a generally domed or bell-jar shape. While enclosure 400 is shown as having a generally elliptical dome construction, the enclosure may assume other shapes or configurations as are required for a particular application. Similarly, the base can have a substantially oval cross-section in the transverse direction that matches the shape of the open end of the cover 410. However, shape of the transverse cross-section of the cover and base may be substantially circular, rectangular, square, or any other shape as is required or desired for a particular application. The closed second end 404 of the cover 410 may likewise be any suitable shape.

Cover 410 longitudinally extends from an open first end 402 to a closed second end 404. The cover defines an internal cavity (not shown) within the cover extending in the longitudinal direction from the first end to the second closed end of the cover. Cover 410 can be slid over at least a portion of base 420 and secured in place by a securing mechanism (not shown) such as a clamp, a bail, a swing latch, buckle latch or another conventional latching mechanism.

FIGS. 10B and 10C show the internal components an exemplary cell tower enclosure 400. Base 420 includes a plurality of ports 425 for receiving optical fiber cables, power cables and/or optical/electrical hybrid cables. The number ports may vary depending on specific network configuration on the tower (i.e. the number of remote radio units being served by the enclosure as well as by the type and number of cables entering and exiting the cell tower enclosure). For example, each remote radio unit can be served by two optical fibers and a pair of power conductors. Thus, the jumper lines can be individual jacketed cables each carrying a separate conductor (optical or electrical), multi-conductor cables carrying at least two optical fibers or two electrical conductors or a hybrid cable carrying at least two optical fibers and two electrical conductors. Thus for an enclosure that supports one radio head, the jumper lines and distribution cable(s) will comprise at least two optical fibers and two electrical conductors as either a hybrid cable or separate media cables. The cable ports can be round, elliptical, hexagonal or any other polygonal shape.

Support frame 430 can be secured to the base 420 by one or more mounting bracket portions 431 extending from the support frame as shown in the figures. The mounting bracket portions can be configured to be secured to the base 420 by bolts, screws or other mechanical fastening mechanism known in the art.

In one exemplary aspect, the support frame 430 is shaped to extend longitudinally into the internal cavity of cover 410 when the cover is secured to base 420. Support frame 430 can be configured to support cable management device 450. Cable management device 450 can be removably connected to support frame 430 by a suitable conventional means, such as screws, bolts, snap-fit, or mechanical interference fit, or permanently connected to support frame 430 by a suitable conventional means, such as rivets, welding, or adhesive, for example.

As in previous embodiments, cell tower enclosure 400 includes power connection portion and an optical fiber management portion. The fiber optic connection portion consists of cable management device 450.

The power connection portion can be attached to the support frame and can include at least one of an alarm connection strip 148, an electrical device 144, and a power connection strip 146 to connect the power conductors from the incoming distribution cable to the electrical device and from the electrical device to the conductors in the outgoing jumper lines. The alarm connection strip, electrical device, and/or a power connection strip can be connected to mounting rail 432 by a Din rail 140. The DIN rail can be secured to the mounting rail, by a screw, bolt or other mechanical fastener. Additionally, DIN stops 142 can be disposed at the top and bottom of the DIN rail to retain the connection strips and/or electrical devices on the DIN Rail.

Cable management device 450 can have a bottom portion 451 defined by four edges. The edges can gave a plurality of vertical tabs 452 extending from the bottom portion. In the embodiment shown in FIGS. 10B-10C, the longitudinal edges of the cable management device are defined by two vertical tabs while the transverse edges are also defined by two vertical tabs.

The base portion 451 can be solid, have a webbed structure, or have a window frame shape as shown in FIGS. 10B-10C. The webbed structure and window frame shape offer the advantage of reducing the weight of cable management device 450 while maintain its structural integrity. Advantageously, the power connection portion of enclosure 400 is accessible through the window frame shape of the base portion of the cable management device allowing installation, servicing and/or replacement of components in the power connection portion without disturbing the optical connections.

Cable management device 450 additionally includes a pair of outward facing L-shape tabs 453 near each transverse edge and positioned on either side of the two vertical tabs extending from each transverse edge of base portion 451. A rounded bend control portion 454 can be attached to each L-shaped tab 453 to guide and control the routing of optical fiber cables in the enclosure. The combination of the two bend control portions at each transverse edge help support the optical cables over an approximate 180° arc to prevent violating the minimum bend radius of the optical fiber disposed in cable management device 450.

A mounting bracket 455 for holding a plurality of fiber optic connector adapters 160 can be disposed along one of the longitudinal edges of cable management device and holds two fiber optic connector adapters. Fiber optic connector adapters 160 can be any conventional fiber optic connector adapters described previously.

Figure 11A:
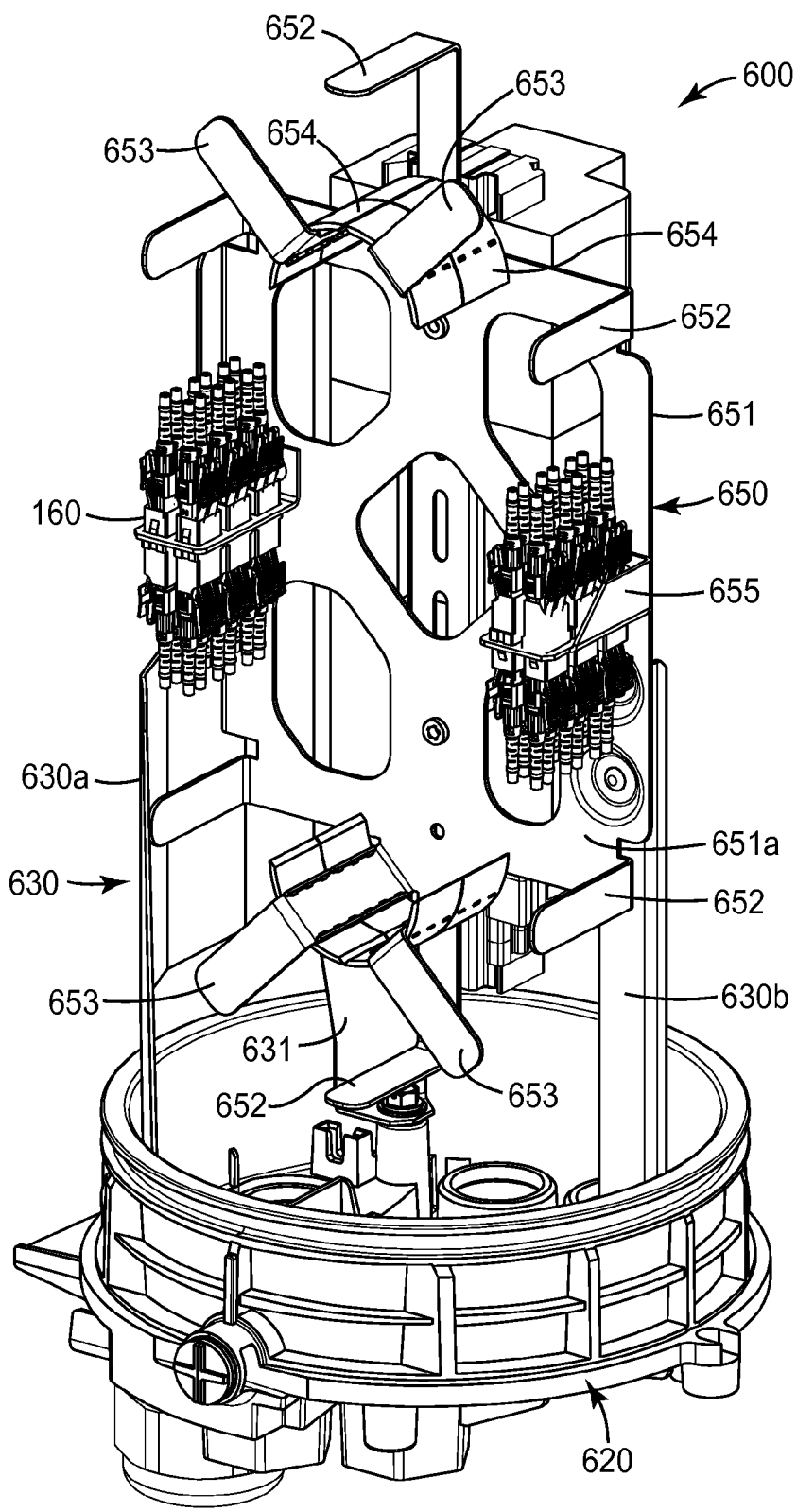
FIGS. 11A and 11B are two views of an alternative base and support frame usable in the cell tower enclosure of FIG. 10A.
Figure 11B:
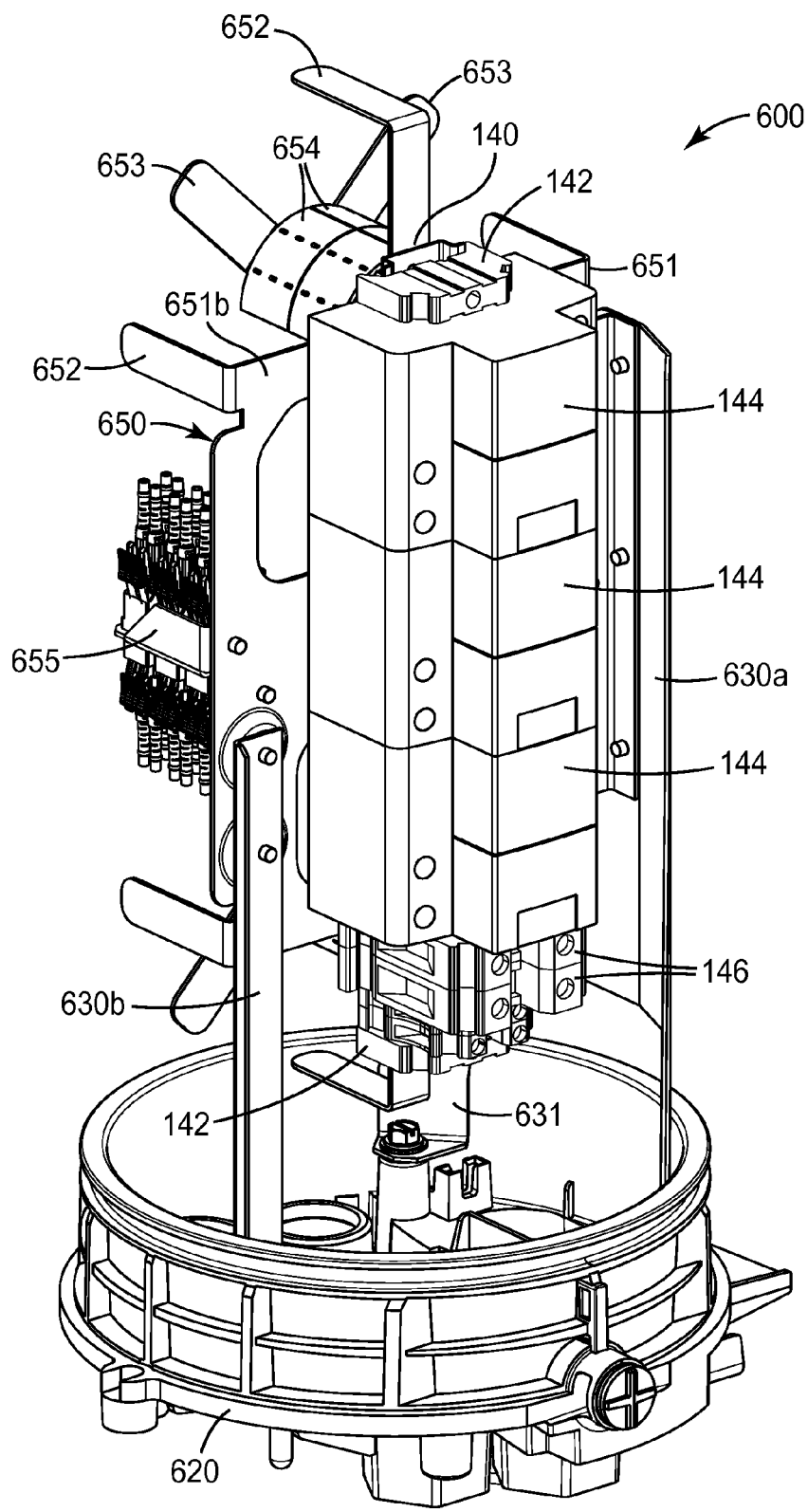

FIGS. 11A-11B show yet another embodiment of the internal components an exemplary cell tower enclosure 600 that is configured as an interconnection point for the optical signal and electrical power feeds. This configuration provides a compact enclosure designed to support three remote radio units. The base 620 is analogous to base 420 shown in FIGS. 10B and 10C and is mateable with cover 410 shown in FIG. 10A.

Base 620 and cover 410 (FIG. 10A) are configured for engagement with each other and used, to form a protective re-enterable enclosure.

For a three remote radio unit support enclosure, the jumper lines can be individual jacketed cables each carrying a separate conductor (optical or electrical), multi-conductor cables carrying at least six optical fibers or three two fiber cables and three two electrical conductor electrical cables or three hybrid cable carrying two optical fibers and two electrical conductors. The distribution cable can be a multi-fiber optical cable having six or more optical fibers and three electrical cables having two electrical conductors each or a single hybrid distribution cable can be used. If a hybrid conductor distribution cable is used in conjunction with the present enclosure, the hybrid cable will have six or more optical fibers wherein the extra fibers will be unused dark fibers.

Support frame 630 can be secured to the base 620 by one or more mounting bracket portions 631 extending from the support frame as shown in the figures. The mounting bracket portions can be configured to be secured to the base 620 by bolts, screws or other mechanical fastening mechanism 195 known in the art.

In one exemplary aspect, the support frame 630 is shaped to extend longitudinally into the internal cavity of cover 410 when the cover is secured to base 620. Support frame 630 can be configured to support cable management device 650. Cable management device 650 can be removably connected to support frame 630 by a suitable conventional means, such as screws, bolts, snap-fit, or mechanical interference fit, or permanently connected to support frame 630 by a suitable conventional means, such as rivets, welding, or adhesive, for example. In an exemplary aspect the support frame comprises two support portions 630a, 630b disposed on either side of base 620 to provide stable support to cable management device 650.

As in previous embodiments, cell tower enclosure 600 includes power connection portion and an optical fiber management portion. The fiber optic connection portion consists of cable management device 650. In contrast to prior embodiment of exemplary cell tower enclosures describe previously, the power connection portion of cell tower enclosure 600 is disposed on the backside of cable management device 650.

Cable management device 650 can have a bottom portion 651 having a front side 651a and a backside 651b and defined by four edges. The edges can gave a plurality of vertical tabs 652 extending from the bottom portion. In the embodiment shown in FIGS. 11A and 11B, the longitudinal edges of the cable management device are defined by two vertical tabs while the transverse edges are also defined by one vertical tab.

The base portion 651 can be solid, have a webbed structure (FIGS. 11A and 11B), or have a window frame shape. The webbed structure and window frame shape offer the advantage of reducing the weight of cable management device 650 while maintaining its structural integrity.

Cable management device 650 additionally includes a pair of outward facing L-shape tabs 653 near each transverse edge and positioned on either side of the vertical tab extending from the transverse edge of base portion 651. A rounded bend control portion 654 can be attached to each L-shaped tab 653 to guide and control the routing of optical fiber cables in the enclosure. The combination of the two bend control portions at each transverse edge help support the optical cables over an approximate 180° arc to prevent violating the minimum bend radius of the optical fiber disposed in cable management device 650.

A mounting bracket 655 for holding a plurality of fiber optic connector adapters 160 can be disposed along at least one longitudinal edge of cable management device. The exemplary cable management device 650 includes two mounting brackets 655 extending perpendicularly from the front side 651a of base portion 651 where in the mounting brackets are designed to hold six fiber optic connector adapters. Fiber optic connector adapters 160 can be any conventional fiber optic connector adapters described previously.

The power connection portion of cell tower enclosure 600 can include at least one of an alarm connection strip, an electrical device 144, and a power connection strip 146 to serve as a grounding bus for the power conductors from the incoming distribution cable and the outgoing jumper lines as well as for the electrical device. In the exemplary aspect shown in FIG. 11B, power connection portion of cell tower enclosure 400 can includes three electrical devices 144, and two power connection strips 146 attached to the backside 651b of cable management device 650 by a DIN rail 140. The DIN rail can be secured to the cable management device, by screws, bolts or other mechanical fasteners. Additionally, DIN stops 142 can be disposed at the top and bottom of the DIN rail to retain the connection strips and/or electrical devices on the DIN Rail.

Figure 12:
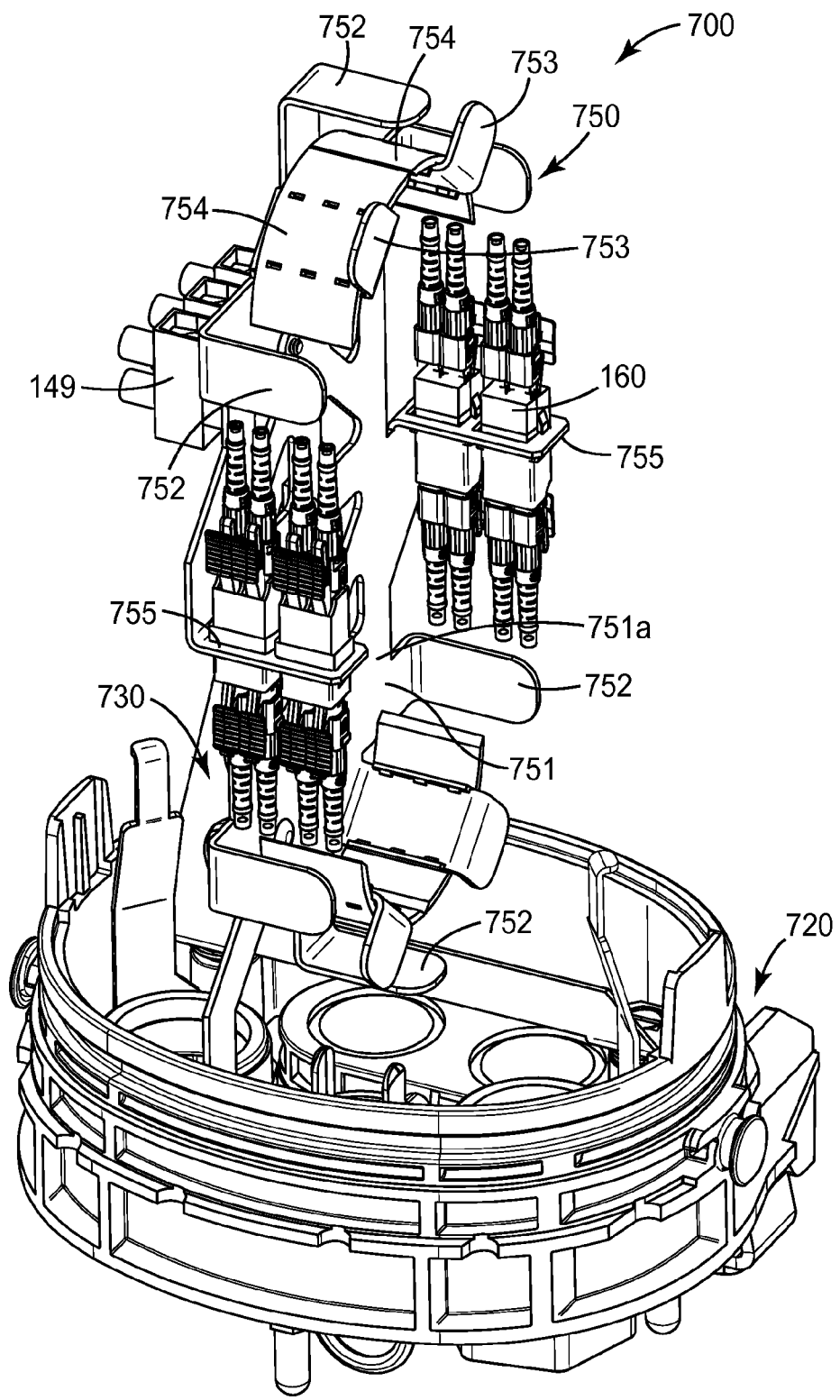
FIG. 12 is an isometric view of yet another alternative base and support frame usable in the cell tower enclosure of FIG. 10A.

FIG. 12 shows yet another embodiment of the internal components of an exemplary cell tower enclosure 700 (i.e. not including the cover of the enclosure) that is configured as an interconnection point for the optical signals and electrical power feeds. This configuration provides a compact enclosure designed to support one remote radio unit. The base 720 is analogous to base 420 shown in FIGS. 10B and 10C and is mateable with cover 410 shown in FIG. 10A.

Support frame 730 can be secured to the base 720 by one or more mounting bracket portions (not shown) extending from the support frame to secure the support frame the base by bolts, screws or other mechanical fastening mechanism known in the art.

In one exemplary aspect, the support frame 730 is shaped to extend longitudinally into the internal cavity of cover 410 when the cover is secured to base 720. Support frame 730 can be configured to support cable management device 750. Cable management device 750 can be removably connected to support frame 730 by a suitable conventional means, such as screws, bolts, snap-fit, or mechanical interference fit, or permanently connected to support frame 730 by a suitable conventional means, such as rivets, welding, or adhesive, for example.

As in previous embodiments, cell tower enclosure 700 includes power connection portion and an optical fiber management portion. The fiber optic connection portion includes cable management device 750 and wherein the power connection portion of cell tower enclosure 700 is disposed on the backside of cable management device 750.

Cable management device 750 can have a bottom portion 751 having a front side 751a and a backside (not shown) disposed opposite the front side and defined by four edges. The edges can have a plurality of vertical tabs 752 extending from the bottom portion. In the embodiment shown in FIG. 12, the longitudinal edges of the cable management device are defined by two vertical tabs while the transverse edges are defined by one vertical tab.

Cable management device 750 additionally includes a pair of outward facing L-shape tabs 753 near each transverse edge and positioned on either side of the vertical tab extending from the transverse edge of base portion 751. A rounded bend control portion 754 can be attached to each L-shaped tab 753 to guide and control the routing of optical fiber cables in the enclosure. The combination of the two bend control portions at each transverse edge help support the optical cables over an approximate 180° arc to prevent violating the minimum bend radius of the optical fiber disposed in cable management device 750.

A mounting bracket 755 for holding a plurality of fiber optic connector adapters 160 can be disposed along at least one longitudinal edge of cable management device. The exemplary cable management device 750 includes two mounting brackets 755 extending perpendicularly from the front side 751a of base portion 751 wherein each of the mounting brackets is designed to hold two fiber optic connector adapters. Fiber optic connector adapters 160 can be any conventional fiber optic connector adapters described previously.

The power connection portion of cell tower enclosure 700 includes a conventional power connection terminal strip 149 configured for the direct interconnection of the power conductors from the incoming distribution cable and the outgoing jumper power lines. An exemplary power connection terminal strip can be Eurostyle® two-screw barrier strips available from Molex, Inc. (Lisle, Ill.).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An enclosure for protecting cables at a demarcation point on a cell tower, the enclosure comprising:
a cover longitudinally extending from an open first end to a closed second end, the cover defining an internal cavity extending in the longitudinal direction;
a base configured for attachment to the open first end of the cover to provide an enclosed configuration, the base including a plurality of cable ports passing through the base to allow passage cables therethrough, wherein the cover can be secured over at least a portion of the base; and
a cable management device having connected to the base by a support frame, wherein the cable management device comprises a base portion having four edges defined by a plurality of vertical tabs extending from the base portion, wherein two of the edges are transverse edges, each having a rounded bend control portion that is clipped onto outward facing L-shape tabs disposed near each transverse edge and wherein the other two edges are longitudinal edges each of which is disposed perpendicularly to and between the transverse edges, and a plurality of optical fiber connector adapters secured in a mounting bracket extending perpendicularly from the base portion along at least one of the longitudinal edges such that the optical fiber connector adapters are disposed within the cable channel defined by the vertical tabs and the outward facing L-shape tabs.

2. The enclosure of claim 1, wherein the cable management device is disposed in a fiber optic connection portion of the enclosure disposed at a lower section of the support frame.

3. The enclosure of claim 1, further comprising a power connection portion disposed on an upper section of the support frame.

4. The enclosure of claim 3, wherein the power connection portion can include an electrical device, wherein the electrical device is one of an electrical terminal strip, a surge protector and an electrical breaker.

5. The enclosure of claim 4, comprises a plurality of cable management devices and a plurality of electrical devices arranged in a radial arrangement within the cell tower enclosure.

6. The enclosure of claim 4, wherein the electrical device is secured to the support frame by a DIN rail.

7. The enclosure of claim 1, wherein the optical fiber connector adapters are configured to intermate two LC-format optical connectors.

8. The enclosure of claim 1, further comprising an electrical device secured to a backside of the cable management device.

9. An enclosure for protecting cables at a demarcation point on a cell tower, the enclosure comprising:
- a cover longitudinally extending from an open first end to a closed second end, the cover defining an internal cavity extending in the longitudinal direction;
- a base configured for attachment to the open first end of the cover to provide an enclosed configuration, the base including a plurality of cable ports passing through the base to allow passage cables therethrough, wherein the cover can be secured over at least a portion of the base;
- a support frame connected to the base and extending into the internal cavity of the cover when the cover is secured to the base;
- a cable management device mounted to the support frame, the cable management device comprising a base portion having four edges defined by a plurality of vertical tabs extending from the base portion, wherein two of the edges are transverse edges, each having a rounded bend control portion that is clipped onto outward facing L-shape tabs disposed near each transverse edge and wherein the other two edges are longitudinal edges each of which is disposed perpendicularly to and between the transverse edges, and a plurality of optical fiber connector adapters secured in a mounting bracket extending perpendicularly from the base portion along at least one of the longitudinal edges such that the optical fiber connector adapters are disposed within the cable channel defined by the vertical tabs and the outward facing L-shape tabs; and
- an electrical device also mounted to the support frame.

10. The enclosure of claim 9, wherein the cable management device is connected to a lower section of the support frame and the electrical device secured to an upper section of the support frame.

11. The enclosure of claim 9, wherein the cable management device and the electric device are secured to opposite sides of the support frame.

12. The enclosure of claim 9, wherein the electrical device secured to the cable management device.

13. The enclosure of claim 9, comprising a plurality of cable management devices and a plurality of electric power surge protectors arranger in a radial arrangement around the support frame.

14. The enclosure of claim 9, further comprising and a plurality of optical fiber connector adapters secured along at least one of the longitudinal edges of the cable management device.

15. The enclosure of claim 9, wherein the electrical device is one of an electrical terminal strip, a surge protector and an electrical breaker.

16. A cable management device, the device comprising:
- a base portion having four edges defined by a plurality of vertical tabs extending from the base portion, wherein two of the edges are transverse edges, each having a rounded bend control portion that is clipped onto outward facing L-shape tabs disposed near each transverse edge and wherein the other two edges are longitudinal edges each of which is disposed perpendicularly to and between the transverse edges, and
- a plurality of optical fiber connector adapters secured in a mounting bracket extending perpendicularly from the base portion along at least one of the longitudinal edges such that the optical fiber connector adapters are disposed within the cable channel defined by the vertical tabs and the outward facing L-shape tabs.

17. The device of claim 16, further comprising a mounting bracket extending from at least one of the longitudinal edges to hold the optical fiber connector adapters.

18. The device of claim 16, comprises a mounting bracket extending from both longitudinal edges to hold the plurality optical fiber connector adapters adjacent to each longitudinal edge of the device.

19. The device of claim 16, where in the base portion has a webbed structure.

20. The device of claim 16, where in the base portion has a window frame structure.

* * * * *